(12) United States Patent
Chen et al.

(10) Patent No.: US 9,638,888 B2
(45) Date of Patent: May 2, 2017

(54) IMAGING LENS, AND ELECTRONIC APPARATUS INCLUDING THE SAME

(71) Applicant: Genius Electronic Optical Co., Ltd., Taichung (TW)

(72) Inventors: Feng Chen, Xiamen (CN); Kai-Lun Wang, Xiamen (CN); Long Ye, Xiamen (CN)

(73) Assignee: Genius Electronic Optical Co., Ltd., Taichung (TW)

( * ) Notice: Subject to any disclaimer, the term of this patent is extended or adjusted under 35 U.S.C. 154(b) by 197 days.

(21) Appl. No.: 14/324,417

(22) Filed: Jul. 7, 2014

(65) Prior Publication Data

US 2015/0212389 A1   Jul. 30, 2015

(30) Foreign Application Priority Data

Jan. 27, 2014   (CN) .......................... 2014 1 0040101

(51) Int. Cl.

| | | |
|---|---|---|
| *G02B 13/18* | (2006.01) | |
| *G02B 9/60* | (2006.01) | |
| *G02B 13/00* | (2006.01) | |
| *H04N 101/00* | (2006.01) | |

(52) U.S. Cl.
   CPC ........... *G02B 9/60* (2013.01); *G02B 13/0045* (2013.01); *H04N 2101/00* (2013.01)

(58) Field of Classification Search
   CPC . G02B 9/00; G02B 9/60; G02B 13/00; G02B 13/001; G02B 13/0015; G02B 13/002; G02B 13/0045; H04N 5/14
   See application file for complete search history.

(56) References Cited

U.S. PATENT DOCUMENTS

| | | | |
|---|---|---|---|
| 7,609,313 B2 * | 10/2009 | Yamaguchi | .......... H04N 5/2254 348/335 |
| 8,305,697 B1 | 11/2012 | Chen et al. | |
| 8,325,429 B2 | 12/2012 | Tang et al. | |
| 8,456,758 B1 | 6/2013 | Huang et al. | |
| 8,467,137 B2 | 6/2013 | Yonezawa et al. | |
| 8,508,859 B2 | 8/2013 | Tsai et al. | |
| 2012/0162769 A1 | 6/2012 | Suzuki et al. | |
| 2012/0261550 A1 | 10/2012 | Chou et al. | |
| 2013/0050847 A1 | 2/2013 | Hsu et al. | |
| 2013/0114151 A1 | 5/2013 | Chen et al. | |
| 2013/0162769 A1 * | 6/2013 | Zhou | ........................ H04N 5/14 348/43 |
| 2013/0182336 A1 | 7/2013 | Hsu et al. | |
| 2013/0201567 A1 | 8/2013 | Tsai et al. | |
| 2013/0201568 A1 | 8/2013 | Tsai et al. | |
| 2013/0229718 A1 | 9/2013 | Tsai et al. | |

(Continued)

FOREIGN PATENT DOCUMENTS

| | | | |
|---|---|---|---|
| TW | 201232085 A | 8/2012 | |
| TW | 201239444 A | 10/2012 | |
| TW | 201248187 A | 12/2012 | |

(Continued)

*Primary Examiner* — Thong Nguyen
(74) *Attorney, Agent, or Firm* — Jianq Chyun IP Office

(57) ABSTRACT

An imaging lens includes first to fifth lens elements arranged from an object side to an image side in the given order. Through designs of surfaces of the lens elements and relevant optical parameters, a short system length of the imaging lens may be achieved while maintaining good optical performance.

15 Claims, 37 Drawing Sheets

(56) References Cited

U.S. PATENT DOCUMENTS

2013/0258164 A1\* 10/2013 Chang .................... G02B 9/60
348/345
2013/0265650 A1   10/2013 Chen et al.

FOREIGN PATENT DOCUMENTS

| TW | 201303411 A  | 1/2013 |
| TW | 201310059 A  | 3/2013 |
| TW | 201310060 A  | 3/2013 |
| TW | 201321792 A  | 6/2013 |
| TW | 201331619 A  | 8/2013 |
| TW | 201333520 A1 | 8/2013 |

\* cited by examiner

| system focal length=2.724mm, half field-of-view=39.383°, F-number=2.07, system length=4.025mm | | | | | | |
|---|---|---|---|---|---|---|
| lens element | surface | radius of curvature | thickness | refractive index | Abbe number | focal length |
| object | | ∞ | ∞ | | | |
| aperture stop 2 | | ∞ | -0.05 | | | |
| first lens element 3 | object-side surface 31 | 2.262154 | 0.5555361 | 1.535 | 55.7124 | 2.631 |
| | image-side surface 32 | -3.436557 | 0.08013841 | | | |
| second lens element 4 | object-side surface 41 | 14.05523 | 0.3480496 | 1.6428 | 22.4373 | -3.489 |
| | image-side surface 42 | 1.928465 | 0.1598956 | | | |
| third lens element 5 | object-side surface 51 | 5.408555 | 0.416393 | 1.535 | 55.7124 | 7.589 |
| | image-side surface 52 | -16.05925 | 0.1467136 | | | |
| fourth lens element 6 | object-side surface 61 | -1.648149 | 0.5441015 | 1.535 | 55.7124 | 2.209 |
| | image-side surface 62 | -0.7314496 | 0.07919815 | | | |
| fifth lens element 7 | object-side surface 71 | 2.551652 | 0.5245814 | 1.5311 | 55.7441 | -2.227 |
| | image-side surface 72 | 0.7522002 | 0.6886436 | | | |
| optical filter 8 | object-side surface 81 | ∞ | 0.21 | | | |
| | image-side surface 82 | ∞ | 0.2720823 | | | |
| image plane 100 | | ∞ | | | | |

FIG.3

| surface | 31 | 32 | 41 | 42 | 51 |
|---|---|---|---|---|---|
| K | 0.00000E+00 | 0.00000E+00 | 0.00000E+00 | 0.00000E+00 | 0.00000E+00 |
| a4 | -0.028907339 | -0.080122005 | -0.19648151 | -0.19283467 | -0.15258128 |
| a6 | -0.081748128 | -0.32067983 | -0.23443159 | 0.058867744 | 0.065363562 |
| a8 | -0.19360806 | 0.012684796 | 0.12867009 | -0.091974553 | 0 |
| a10 | 0.44938057 | 0.51130809 | 0.081620018 | 0.016625854 | 0 |
| a12 | -0.89048833 | -0.63199685 | 0 | 0 | 0 |
| a14 | 0 | 0 | 0 | 0 | 0 |
| a16 | 0 | 0 | 0 | 0 | 0 |
| surface | 52 | 61 | 62 | 71 | 72 |
| K | 0.00000E+00 | 0.00000E+00 | -9.35532E-01 | 0.00000E+00 | -4.73059E+00 |
| a4 | -0.14258095 | 0.046167836 | 0.40715425 | -0.20146609 | -0.10070577 |
| a6 | 0.046437533 | 0.10562896 | -0.53675255 | 0.043278802 | 0.040045996 |
| a8 | 0 | 0.075885489 | 0.67459894 | -0.016245149 | -0.015936101 |
| a10 | 0 | -0.096313837 | -0.34081441 | 0.004849561 | 0.003401874 |
| a12 | 0 | 0 | 0.067180916 | 0 | -0.000333754 |
| a14 | 0 | 0 | 0 | 0 | 0 |
| a16 | 0 | 0 | 0 | 0 | 0 |

FIG.4 system focal length=2.691mm, half field-of-view=39.658°, F-number =2.058, system length=3.925mm

| lens element | surface | radius of curvature | thickness | refractive index | Abbe number | material | focal length |
|---|---|---|---|---|---|---|---|
| object | | ∞ | ∞ | | | | |
| aperture stop 2 | | ∞ | -0.05 | | | | |
| first lens element 3 | object-side surface 31 | 2.149254 | 0.5747613 | 1.535 | 55.7124 | plastic | 2.607 |
| | image-side surface 32 | -3.637752 | 0.0812835 | | | | |
| second lens element 4 | object-side surface 41 | 14.10018 | 0.2145145 | 1.6428 | 22.4373 | plastic | -3.525 |
| | image-side surface 42 | 1.9537 | 0.0965596 | | | | |
| third lens element 5 | object-side surface 51 | 5.790232 | 0.4142005 | 1.535 | 55.7124 | plastic | 7.433 |
| | image-side surface 52 | -12.51046 | 0.221214 | | | | |
| fourth lens element 6 | object-side surface 61 | -1.678891 | 0.5423449 | 1.535 | 55.7124 | plastic | 2.06 |
| | image-side surface 62 | -0.741973 | 0.0623755 | | | | |
| fifth lens element 7 | object-side surface 71 | 2.499857 | 0.5406021 | 1.5311 | 55.7441 | plastic | -2.233 |
| | image-side surface 72 | 0.7455663 | 0.6886436 | | | | |
| optical filter 8 | object-side surface 81 | ∞ | 0.21 | | | | |
| | image-side surface 82 | ∞ | 0.2780159 | | | | |
| image plane 100 | | ∞ | | | | | |

FIG.7

| surface | 31 | 32 | 41 | 42 | 51 |
|---|---|---|---|---|---|
| K | 0 | 0 | 0.00E+00 | 0.00E+00 | 0.00E+00 |
| a4 | -0.034665 | -0.081766 | -0.199028 | -0.206543 | -0.154922 |
| a6 | -0.08714 | -0.307783 | -0.260969 | 0.0503729 | 0.0652509 |
| a8 | -0.18699 | 0.0021392 | 0.1252433 | -0.093855 | 0 |
| a10 | 0.4939202 | 0.4640784 | 0.0862465 | 0.0168484 | 0 |
| a12 | -0.883789 | -0.543958 | 0 | 0 | 0 |
| a14 | 0 | 0 | 0 | 0 | 0 |
| a16 | 0 | 0 | 0 | 0 | 0 |

| surface | 52 | 61 | 62 | 71 | 72 |
|---|---|---|---|---|---|
| K | 0.00E+00 | 0.00E+00 | -0.934579 | 0 | -4.573927 |
| a4 | -0.141785 | 0.0458992 | 0.4067346 | -0.200847 | -0.097227 |
| a6 | 0.0477408 | 0.1047733 | -0.53686 | 0.0432783 | 0.0401145 |
| a8 | 0 | 0.07377373 | 0.6746471 | -0.016372 | -0.015835 |
| a10 | 0 | -0.099733 | -0.340876 | 0.004686 | 0.0034632 |
| a12 | 0 | 0 | 0.066799 | 0 | -0.000329 |
| a14 | 0 | 0 | 0 | 0 | 0 |
| a16 | 0 | 0 | 0 | 0 | 0 |

FIG.8

| system focal length=2.549mm, half field-of-view=41.252°, F-number =2.067,system length=3.815mm | | | | | | | |
|---|---|---|---|---|---|---|---|
| lens element | surface | radius of curvature | thickness | refractive index | Abbe number | material | focal length |
| object | | ∞ | ∞ | | | | |
| aperture stop 2 | | ∞ | -0.05 | | | | |
| first lens element 3 | object-side surface 31 | 2.166743 | 0.6047433 | 1.535 | 55.7124 | plastic | 2.604 |
| | image-side surface 32 | -3.554315 | 0.0776534 | | | | |
| second lens element 4 | object-side surface 41 | 14.72337 | 0.2498854 | 1.6428 | 22.4373 | plastic | -3.721 |
| | image-side surface 42 | 2.058071 | 0.144276 | | | | |
| third lens element 5 | object-side surface 51 | 5.144237 | 0.3325121 | 1.535 | 55.7124 | plastic | 7.349 |
| | image-side surface 52 | -16.54226 | 0.1777516 | | | | |
| fourth lens element 6 | object-side surface 61 | -1.745248 | 0.5552155 | 1.535 | 55.7124 | plastic | 2.055 |
| | image-side surface 62 | -0.751064 | 0.080313 | | | | |
| fifth lens element 7 | object-side surface 71 | 2.565902 | 0.5516633 | 1.5311 | 55.7441 | plastic | -2.2 |
| | image-side surface 72 | 0.7445586 | 0.6886436 | | | | |
| optical filter 8 | object-side surface 81 | ∞ | 0.21 | | | | |
| | image-side surface 82 | ∞ | 0.1426787 | | | | |
| image plane 100 | | ∞ | | | | | |

FIG.11

| surface | 31 | 32 | 41 | 42 | 51 |
|---|---|---|---|---|---|
| K | 0.00E+00 | 0.00E+00 | 0.00E+00 | 0.00E+00 | 0.00E+00 |
| a4 | -0.03028 | -0.088496 | -0.206567 | -0.198606 | -0.15507 |
| a6 | -0.071605 | -0.289223 | -0.26209 | 0.0584656 | 0.0614459 |
| a8 | -0.176182 | 0.0174426 | 0.1453596 | -0.092872 | 0 |
| a10 | 0.4404408 | 0.4149652 | 0.0786504 | 0.0149873 | 0 |
| a12 | -0.812618 | -0.479551 | 0 | 0 | 0 |
| a14 | 0 | 0 | 0 | 0 | 0 |
| a16 | 0 | 0 | 0 | 0 | 0 |
| surface | 52 | 61 | 62 | 71 | 72 |
| K | 0.00E+00 | 0.00E+00 | -0.932203 | 0 | -4.558963 |
| a4 | -0.146529 | 0.04882 | 0.4057618 | -0.200455 | -0.09276 |
| a6 | 0.0488743 | 0.1048507 | -0.537201 | 0.0435529 | 0.0399664 |
| a8 | 0 | 0.0730063 | 0.6748137 | -0.016156 | -0.015925 |
| a10 | 0 | -0.100606 | -0.340289 | 0.0048412 | 0.0034405 |
| a12 | 0 | 0 | 0.0676551 | 0 | -0.000336 |
| a14 | 0 | 0 | 0 | 0 | 0 |
| a16 | 0 | 0 | 0 | 0 | 0 |

FIG.12 system focal length=2.981mm, half field-of-view=37.220°, F-number =2.023, system length=4.349mm

| lens element | surface | radius of curvature | thickness | refractive index | Abbe number | material | focal length |
|---|---|---|---|---|---|---|---|
| object | | ∞ | ∞ | | | | |
| aperture stop 2 | | ∞ | -0.08 | | | | |
| first lens element 3 | object-side surface 31 | 1.813878 | 0.743621 | 1.535 | 55.7124 | plastic | 3.617 |
| | image-side surface 32 | 23.63184 | 0.08 | | | | |
| second lens element 4 | object-side surface 41 | 4.200474 | 0.26 | 1.6428 | 22.4373 | plastic | -6.924 |
| | image-side surface 42 | 2.116537 | 0.2352069 | | | | |
| third lens element 5 | object-side surface 51 | 11.4558 | 0.7012494 | 1.535 | 55.7124 | plastic | 5.631 |
| | image-side surface 52 | -4.018564 | 0.211724 | | | | |
| fourth lens element 6 | object-side surface 61 | -1.440801 | 0.430858 | 1.535 | 55.7124 | plastic | 2.017 |
| | image-side surface 62 | -0.682728 | 0.0682661 | | | | |
| fifth lens element 7 | object-side surface 71 | 7.107275 | 0.5730478 | 1.5311 | 55.7441 | plastic | -1.705 |
| | image-side surface 72 | 0.7829689 | 0.5802975 | | | | |
| optical filter 8 | object-side surface 81 | ∞ | 0.21 | | | | |
| | image-side surface 82 | ∞ | 0.2545323 | | | | |
| image plane 100 | | ∞ | | | | | |

FIG.15

| surface | 31 | 32 | 41 | 42 | 51 |
|---|---|---|---|---|---|
| K | 0.00E+00 | 0.00E+00 | 0.00E+00 | 0.00E+00 | 0.00E+00 |
| a4 | -0.046725 | -0.291961 | -0.444931 | -0.248654 | -0.053599 |
| a6 | 0.2569418 | 0.31453 | 0.2640334 | 0.1777202 | -0.057115 |
| a8 | -0.851324 | -0.611348 | -0.166237 | -0.091151 | 0 |
| a10 | 1.2705493 | 0.6183712 | 0 | 0 | 0 |
| a12 | -0.778615 | -0.324969 | 0 | 0 | 0 |
| a14 | 0 | 0 | 0 | 0 | 0 |
| a16 | 0 | 0 | 0 | 0 | 0 |
| surface | 52 | 61 | 62 | 71 | 72 |
| K | 0.00E+00 | 0.00E+00 | -0.815631 | 0.00E+00 | -5.174578 |
| a4 | -0.143044 | -0.28866 | 0.4471549 | -0.018669 | -0.050556 |
| a6 | -0.027208 | 0.2322358 | -0.687623 | -0.060486 | 0.011929 |
| a8 | 0 | 0.1342788 | 0.9764273 | 0.0185249 | -0.003314 |
| a10 | 0 | -0.158747 | -0.587366 | -0.000805 | 0.0004065 |
| a12 | 0 | 0.0229265 | 0.130492 | 0 | -4.45E-05 |
| a14 | 0 | 0 | 0 | 0 | 3.56E-06 |
| a16 | 0 | 0 | 0 | 0 | 0 |

FIG.16

| system focal length=3.390mm, half field-of-view=39.865°, F-number =1.999, system length=4.559mm | | | | | | |
|---|---|---|---|---|---|---|
| lens element | surface | radius of curvature | thickness | refractive index | Abbe number | focal length |
| object | | ∞ | ∞ | | | |
| aperture stop 2 | | ∞ | -0.14 | | | |
| first lens element 3 | object-side surface 31 | 1.94736 | 0.551992 | 1.5441 | 56.1143 | 4.204 |
| | image-side surface 32 | 11.56028 | 0.1289742 | | | |
| second lens element 4 | object-side surface 41 | 3.01003 | 0.26 | 1.6397 | 23.5288 | -10.018 |
| | image-side surface 42 | 1.983533 | 0.2152678 | | | |
| third lens element 5 | object-side surface 51 | -60.26421 | 0.4854728 | 1.5441 | 56.1143 | 3.488 |
| | image-side surface 52 | -1.851422 | 0.3566951 | | | |
| fourth lens element 6 | object-side surface 61 | -0.676114 | 0.3 | 1.6397 | 23.5288 | -4.665 |
| | image-side surface 62 | -1.02392 | 0.0777668 | | | |
| fifth lens element 7 | object-side surface 71 | 1.447425 | 0.9416341 | 1.5311 | 55.7441 | 12.263 |
| | image-side surface 72 | 1.438785 | 0.5 | | | |
| optical filter 8 | object-side surface 81 | ∞ | 0.21 | | | |
| | image-side surface 82 | ∞ | 0.531526 | | | |
| image plane 100 | | ∞ | | | | |

FIG.19

| surface | 31 | 32 | 41 | 42 | 51 |
|---|---|---|---|---|---|
| K | -2.768048 | 0.00E+00 | 0.00E+00 | -8.362248 | 0.00E+00 |
| a4 | 0.0227177 | -0.2241 | -0.429722 | -0.185574 | -0.112123 |
| a6 | -0.008706 | 0.2299339 | 0.4127664 | 0.2161454 | -0.029719 |
| a8 | 0.0081595 | -0.355024 | -0.450404 | -0.229859 | 0.1760652 |
| a10 | -0.106477 | 0.1726563 | 0.0545294 | 0.0041155 | -0.091606 |
| a12 | 0.0025958 | -0.038036 | 0.1730579 | 0.0989065 | -0.014313 |
| a14 | 0.147953 | 0 | -0.053398 | -0.10894 | 0.0120165 |
| a16 | -0.14711 | 0 | -0.003635 | 0.0425042 | -0.006856 |
| surface | 52 | 61 | 62 | 71 | 72 |
| K | 1.362571 | -4.140039 | -0.918815 | -14.17571 | -6.050959 |
| a4 | -0.030643 | -0.355711 | 0.0877522 | -0.146278 | -0.068083 |
| a6 | -0.061251 | 0.5753381 | 0.0194137 | 0.0483697 | 0.0208703 |
| a8 | 0.2114604 | -0.527579 | 0.0101212 | -0.017286 | -0.005428 |
| a10 | -0.067203 | 0.562863 | 0.0388472 | 0.0062492 | 0.0007413 |
| a12 | 0.0524746 | -0.439366 | -0.037583 | -0.000756 | -1.91E-05 |
| a14 | -0.014471 | 0.1530333 | 0.0049941 | -8.07E-05 | -8.20E-06 |
| a16 | -0.009243 | -0.018354 | 0.0021039 | 1.66E-05 | 6.87E-07 |

FIG.20 system focal length=3.412mm, half field-of-view=39.938°, F-number =2.001,system length=4.729mm

| lens element | surface | radius of curvature | thickness | refractive index | Abbe number | material | focal length |
|---|---|---|---|---|---|---|---|
| object | | ∞ | ∞ | | | | |
| aperture stop 2 | | ∞ | -0.14 | | | | |
| first lens element 3 | object-side surface 31 | 1.996793 | 0.7192854 | 1.5441 | 56.1143 | plastic | 4.169 |
| | image-side surface 32 | 14.19577 | 0.0974688 | | | | |
| second lens element 4 | object-side surface 41 | 2.998715 | 0.231289 | 1.6397 | 23.5288 | plastic | -9.026 |
| | image-side surface 42 | 1.919017 | 0.2163446 | | | | |
| third lens element 5 | object-side surface 51 | -42.72468 | 0.5118656 | 1.5441 | 56.1143 | plastic | 3.581 |
| | image-side surface 52 | -1.877131 | 0.3013893 | | | | |
| fourth lens element 6 | object-side surface 61 | -0.674662 | 0.29533 | 1.6397 | 23.5288 | plastic | -4.108 |
| | image-side surface 62 | -1.06066 | 0.0764552 | | | | |
| fifth lens element 7 | object-side surface 71 | 1.329479 | 1.037167 | 1.5311 | 55.7441 | plastic | 7.584 |
| | image-side surface 72 | 1.443972 | 0.5 | | | | |
| optical filter 8 | object-side surface 81 | ∞ | 0.21 | | | | |
| | image-side surface 82 | ∞ | 0.5328937 | | | | |
| image plane 100 | | | | | | | |

FIG.23

| surface | 31 | 32 | 41 | 42 | 51 |
|---|---|---|---|---|---|
| K | -2.542644 | 0 | 0 | -7.312452 | 0 |
| a4 | 0.0275773 | -0.203646 | -0.433015 | -0.176094 | -0.109787 |
| a6 | 0.0040051 | 0.2253581 | 0.4137039 | 0.2218155 | -0.03495 |
| a8 | 0.0184525 | -0.357468 | -0.460962 | -0.226988 | 0.1725494 |
| a10 | -0.098271 | 0.1832918 | 0.0388629 | 0.007917 | -0.091218 |
| a12 | 0.010315 | -0.021306 | 0.163399 | 0.1031569 | -0.011673 |
| a14 | 0.1577638 | 0.0077053 | -0.04989 | -0.105841 | 0.0158532 |
| a16 | -0.131151 | -0.015403 | 0.0151159 | 0.0437624 | -0.002291 |
| surface | 52 | 61 | 62 | 71 | 72 |
| K | 1.205454 | -4.595637 | -0.876954 | -13.15381 | -5.460222 |
| a4 | -0.037135 | -0.361635 | 0.0715117 | -0.135862 | -0.06391 |
| a6 | -0.073982 | .5677074 | 0.0150428 | 0.0480246 | 0.0204983 |
| a8 | 0.2017557 | -0.52781 | 0.0091404 | -0.017623 | -0.005424 |
| a10 | -0.073966 | 0.5662097 | 0.0388653 | 0.006197 | 0.0007481 |
| a12 | 0.0491785 | -0.43623 | -0.037387 | -0.000751 | -1.77E-05 |
| a14 | -0.014121 | 0.1541988 | 0.005128 | -7.64E-05 | -7.98E-06 |
| a16 | -0.005781 | -0.019443 | 0.0021618 | 1.67E-05 | 7.15E-07 |

FIG.24 system focal length=3.378mm, half field-of-view=40.207°, F-number =2.001, system length=4.628mm

| lens element | surface | radius of curvature | thickness | refractive index | Abbe number | material | focal length |
|---|---|---|---|---|---|---|---|
| object | | ∞ | ∞ | | | | |
| aperture stop 2 | | ∞ | -0.14 | | | | |
| first lens element 3 | object-side surface 31 | 1.938473 | 0.6363245 | 1.5441 | 56.1143 | plastic | 4.197 |
| | image-side surface 32 | 11.12245 | 0.1195766 | | | | |
| second lens element 4 | object-side surface 41 | 2.931733 | 0.2359629 | 1.6397 | 23.5288 | plastic | -9.111 |
| | image-side surface 42 | 1.893821 | 0.2130163 | | | | |
| third lens element 5 | object-side surface 51 | -51.4856 | 0.5101745 | 1.5441 | 56.1143 | plastic | 3.519 |
| | image-side surface 52 | -1.85866 | 0.3342198 | | | | |
| fourth lens element 6 | object-side surface 61 | -0.674463 | 0.2932588 | 1.6397 | 23.5288 | plastic | -4.334 |
| | image-side surface 62 | -1.040677 | 0.0744405 | | | | |
| fifth lens element 7 | object-side surface 71 | 1.320051 | 0.9657405 | 1.5311 | 55.7441 | plastic | 8.68 |
| | image-side surface 72 | 1.37746 | 0.5 | | | | |
| optical filter 8 | object-side surface 81 | ∞ | 0.21 | | | | |
| | image-side surface 82 | ∞ | 0.5348931 | | | | |
| image plane 100 | | ∞ | | | | | |

FIG.27

| surface | 31 | 32 | 41 | 42 | 51 |
|---|---|---|---|---|---|
| K | -2.514794 | 0 | 0 | -7.776423 | 0 |
| a4 | 0.02714 | -0.201868 | -0.434138 | -0.178111 | -0.113445 |
| a6 | 0.0007769 | 0.2234574 | 0.4176428 | 0.2237762 | -0.031012 |
| a8 | 0.0160302 | -0.358471 | -0.453331 | -0.224018 | 0.1757055 |
| a10 | -0.100313 | 0.1834236 | 0.0462185 | 0.0092968 | -0.089854 |
| a12 | 0.0078883 | -0.022023 | 0.1680168 | 0.103391 | -0.011012 |
| a14 | 0.1542618 | 0.005883 | -0.049231 | -0.105603 | 0.0161295 |
| a16 | -0.136197 | -0.017355 | 0.0116881 | 0.0447104 | -0.002537 |
| surface | 52 | 61 | 62 | 71 | 72 |
| K | 1.235316 | -4.460922 | -0.918815 | -12.54616 | -5.546372 |
| a4 | -0.036723 | -0.360619 | 0.07759 | -0.137528 | -0.065627 |
| a6 | -0.070389 | 0.5709452 | 0.0160526 | 0.0480287 | 0.0206117 |
| a8 | 0.2045207 | -0.527828 | 0.0091579 | -0.017577 | -0.005434 |
| a10 | -0.071389 | 0.5648282 | 0.0385423 | 0.0061959 | 0.0007455 |
| a12 | 0.0509863 | -0.43725 | -0.037677 | -0.000757 | -1.80E-05 |
| a14 | -0.013471 | 0.1540903 | 0.0049992 | -7.81E-05 | -7.98E-06 |
| a16 | -0.006167 | -0.018722 | 0.0021646 | 1.74E-05 | 7.20E-07 |

| lens element | surface | radius of curvature | thickness | refractive index | Abbe number | material | focal length |
|---|---|---|---|---|---|---|---|
| \multicolumn{8}{|l|}{system focal length=3.661mm, half field-of-view=37.957°, F-number =1.995, system length=5.110mm} |
| object | | ∞ | ∞ | | | | |
| aperture stop 2 | | ∞ | -0.14 | | | | |
| first lens element 3 | object-side surface 31 | 2.108955 | 0.5759554 | 1.5441 | 56.1143 | plastic | 4.667 |
| | image-side surface 32 | 11.06587 | 0.1711335 | | | | |
| second lens element 4 | object-side surface 41 | 2.41264 | 0.2380569 | 1.6397 | 23.5288 | plastic | -8.599 |
| | image-side surface 42 | 1.615934 | 0.2642435 | | | | |
| third lens element 5 | object-side surface 51 | 14.12584 | 0.6027642 | 1.5441 | 56.1143 | plastic | 3.868 |
| | image-side surface 52 | -2.445641 | 0.3942043 | | | | |
| fourth lens element 6 | object-side surface 61 | -0.669812 | 0.2988965 | 1.6397 | 23.5288 | plastic | -3.291 |
| | image-side surface 62 | -1.150131 | 0.0791244 | | | | |
| fifth lens element 7 | object-side surface 71 | 1.234944 | 1.2432 | 1.5311 | 55.7441 | plastic | 4.352 |
| | image-side surface 72 | 1.717107 | 0.5 | | | | |
| optical filter 8 | object-side surface 81 | ∞ | 0.21 | | | | |
| | image-side surface 82 | ∞ | 0.5333856 | | | | |
| image plane 100 | | ∞ | | | | | |

| surface | 31 | 32 | 41 | 42 | 51 |
|---|---|---|---|---|---|
| K | -2.253566 | 0 | 0 | -6.010613 | 0 |
| a4 | 0.0230115 | -0.139229 | -0.410635 | -0.206258 | -0.091141 |
| a6 | -0.017746 | 0.1781659 | 0.4790505 | 0.2879772 | -0.053039 |
| a8 | 0.0367205 | -0.224463 | -0.433917 | -0.230246 | 0.1159035 |
| a10 | -0.049226 | 0.1241108 | 0.0857914 | -0.014442 | -0.080828 |
| a12 | -0.028068 | -0.06746 | 0.1254868 | 0.123235 | 0.0060452 |
| a14 | 0.0752917 | 0.0375414 | -0.109703 | -0.08559 | 0.0193209 |
| a16 | -0.042391 | -0.013497 | 0.033196 | 0.0229266 | -0.004906 |
| surface | 52 | 61 | 62 | 71 | 72 |
| K | 2.085839 | -4.389402 | -0.918815 | -11.1631 | -4.913234 |
| a4 | 0.0039814 | -0.312496 | 0.0273652 | -0.096839 | -0.053837 |
| a6 | -0.132342 | 0.4139114 | 0.0120385 | 0.0433459 | 0.0187025 |
| a8 | 0.1661308 | -0.516197 | -0.007135 | -0.020162 | -0.005181 |
| a10 | -0.089497 | 0.5971809 | 0.0397783 | 0.0059638 | 0.000725 |
| a12 | 0.0449391 | -0.422543 | -0.031708 | -0.000626 | -1.74E-05 |
| a14 | -0.011634 | 0.1551339 | 0.0073019 | -2.87E-05 | -7.11E-06 |
| a16 | -0.000249 | -0.025195 | 0.0001993 | 6.56E-06 | 6.20E-07 |

FIG.32

| relationship | first preferred embodiment | second preferred embodiment | third preferred embodiment | fourth preferred embodiment | fifth preferred embodiment | sixth preferred embodiment | seventh preferred embodiment | eighth preferred embodiment |
|---|---|---|---|---|---|---|---|---|
| T1 | 0.556 | 0.575 | 0.605 | 0.744 | 0.552 | 0.719 | 0.636 | 0.576 |
| G12 | 0.080 | 0.081 | 0.078 | 0.080 | 0.129 | 0.097 | 0.120 | 0.171 |
| T2 | 0.348 | 0.215 | 0.250 | 0.260 | 0.260 | 0.231 | 0.236 | 0.238 |
| G23 | 0.160 | 0.097 | 0.144 | 0.235 | 0.215 | 0.216 | 0.213 | 0.264 |
| T3 | 0.416 | 0.414 | 0.333 | 0.701 | 0.485 | 0.512 | 0.510 | 0.603 |
| G34 | 0.147 | 0.221 | 0.178 | 0.212 | 0.357 | 0.301 | 0.334 | 0.394 |
| T4 | 0.544 | 0.542 | 0.555 | 0.431 | 0.300 | 0.295 | 0.293 | 0.299 |
| G45 | 0.079 | 0.062 | 0.080 | 0.068 | 0.078 | 0.076 | 0.074 | 0.079 |
| T5 | 0.525 | 0.541 | 0.552 | 0.573 | 0.942 | 1.037 | 0.966 | 1.243 |
| G5F | 0.689 | 0.689 | 0.689 | 0.580 | 0.500 | 0.500 | 0.500 | 0.500 |
| TF | 0.210 | 0.210 | 0.210 | 0.210 | 0.210 | 0.210 | 0.210 | 0.210 |
| GFP | 0.272 | 0.278 | 0.143 | 0.255 | 0.532 | 0.533 | 0.535 | 0.533 |
| ALT | 2.389 | 2.287 | 2.295 | 2.709 | 2.539 | 2.795 | 2.641 | 2.959 |
| AAG | 0.466 | 0.461 | 0.480 | 0.595 | 0.779 | 0.692 | 0.741 | 0.909 |
| BFL | 1.171 | 1.177 | 1.042 | 1.045 | 1.242 | 1.243 | 1.245 | 1.243 |

FIG.34

| relationship | first preferred embodiment | second preferred embodiment | third preferred embodiment | fourth preferred embodiment | fifth preferred embodiment | sixth preferred embodiment | seventh preferred embodiment | eighth preferred embodiment |
|---|---|---|---|---|---|---|---|---|
| T1/T3 | 1.337 | 1.389 | 1.817 | 1.061 | 1.137 | 1.405 | 1.247 | 0.956 |
| G34/G23 | 0.919 | 2.278 | 1.236 | 0.902 | 1.657 | 1.393 | 1.569 | 1.492 |
| ALT/T3 | 5.743 | 5.524 | 6.892 | 3.864 | 5.230 | 5.460 | 5.178 | 4.909 |
| BFL/T1 | 2.106 | 2.047 | 1.722 | 1.405 | 2.249 | 1.728 | 1.956 | 2.159 |
| BFL/(G12+G23) | 4.879 | 6.612 | 4.694 | 3.317 | 3.607 | 3.961 | 3.743 | 2.856 |
| ALT/G34 | 16.252 | 10.348 | 12.893 | 12.778 | 7.118 | 9.274 | 7.903 | 7.506 |
| (T3+T5)/G23 | 5.881 | 9.845 | 6.146 | 5.421 | 6.629 | 7.160 | 6.929 | 6.986 |
| (T4+T5)/(G12+G45) | 6.723 | 7.573 | 7.006 | 6.784 | 6.006 | 7.661 | 6.489 | 6.162 |
| (T4+T5)/G34 | 7.272 | 4.900 | 6.219 | 4.736 | 3.481 | 4.421 | 3.767 | 3.912 |
| (T1+T5)/G34 | 7.354 | 5.050 | 6.500 | 6.212 | 4.187 | 5.828 | 4.793 | 4.615 |
| (T3+T4)/(G12+G45) | 6.038 | 6.685 | 5.620 | 7.649 | 3.799 | 4.641 | 4.141 | 3.603 |
| ALT/G23 | 14.931 | 23.577 | 15.938 | 11.528 | 11.795 | 12.919 | 12.400 | 11.198 |
| (T1+T5)/T2 | 3.106 | 5.191 | 4.628 | 5.065 | 5.745 | 7.594 | 6.789 | 7.642 |
| (T3+T4)/T2 | 2.759 | 4.447 | 3.552 | 4.354 | 3.021 | 3.490 | 3.405 | 3.788 |
| (T3+T5)/G34 | 6.401 | 4.321 | 4.972 | 6.009 | 4.001 | 5.140 | 4.416 | 4.683 |

FIG.35

IMAGING LENS, AND ELECTRONIC APPARATUS INCLUDING THE SAME

CROSS-REFERENCE TO RELATED APPLICATION

This application claims priority to Chinese Application No. 201410040101.1, filed on Jan. 27, 2014.

BACKGROUND OF THE INVENTION

1. Field of the Invention

The present invention relates to an imaging lens and an electronic apparatus including the same.

2. Description of the Related Art

In recent years, as use of portable electronic devices (e.g., mobile phones and digital cameras) becomes ubiquitous, much effort has been put into reducing dimensions of portable electronic devices. Moreover, as dimensions of charged coupled device (CCD) and complementary metal-oxide semiconductor (CMOS) based optical sensors are reduced, dimensions of imaging lenses for use with the optical sensors must be correspondingly reduced without significantly compromising optical performance.

In view of the increasing demand for imaging quality, the structure of the traditional four-piece lens may no longer be able to meet the higher demand. Therefore, it is required to develop an optical imaging lens having a reduced dimension and good imaging quality.

Taiwanese patent publication No. 201235694 discloses a conventional imaging lens that includes five lens elements, and that has a system length of over 9 mm, which disfavors reducing a thickness of portable electronic devices, such as mobile phones and digital cameras.

Reducing the system length of the imaging lens while maintaining satisfactory optical performance is always a goal in the industry.

SUMMARY OF THE INVENTION

Therefore, an object of the present invention is to provide an imaging lens having a shorter overall length while maintaining good optical performance.

According to one aspect of the present invention, an imaging lens comprises a first lens element, a second lens element, a third lens element, a fourth lens element and a fifth lens element arranged in order from an object side to an image side along an optical axis of the imaging lens. Each of the first lens element, the second lens element, the third lens element, the fourth lens element and the fifth lens element has a refractive power, an object-side surface facing toward the object side and an image-side surface facing toward the image side.

The first lens element has a positive refractive power. The object-side surface of the second lens element has a convex portion in a vicinity of the optical axis and a concave portion in a vicinity of a periphery of the second lens element. The object-side surface of the third lens element has a concave portion in a vicinity of a periphery of the third lens element. The object-side surface of the fourth lens element has a concave portion in a vicinity of the optical axis, and the image-side surface of the fourth lens element has a convex portion in a vicinity of the optical axis. The object-side surface of the fifth lens element has a convex portion in a vicinity of the optical axis. The image-side surface of the fifth lens element has a concave portion in a vicinity of the optical axis, and a convex portion in a vicinity of a periphery of the fifth lens element. The fifth lens element is made of a plastic material.

The imaging lens satisfies $T1/T3 \geq 0.93$ and $0.90 \leq G34/G23 \leq 2.40$, where $T1$ represents a thickness of the first lens element at the optical axis, $T3$ represents a thickness of the third lens element at the optical axis, $G34$ represents an air gap length between the third lens element and the fourth lens element at the optical axis, and $G23$ represents an air gap length between the second lens element and the third lens element at the optical axis.

The imaging lens does not include any lens element with refractive power other than the first lens element, the second lens element, the third lens element, the fourth lens element and the fifth lens element.

Another object of the present invention is to provide an electronic apparatus having an imaging lens with five lens elements.

According to another aspect of the present invention, an electronic apparatus includes a housing and an imaging module. The imaging module is disposed in the housing, and includes the imaging lens of the present invention, a barrel on which the imaging lens is disposed, a holder unit on which the barrel is disposed, and an image sensor disposed at the image side of the imaging lens.

BRIEF DESCRIPTION OF THE DRAWINGS

Other features and advantages of the present invention will become apparent in the following detailed description of the preferred embodiments with reference to the accompanying drawings, of which:

FIG. 3 shows values of some optical parameters corresponding to the imaging lens of the first preferred embodiment;

FIG. 4 shows values of some parameters of an optical relationship corresponding to the imaging lens of the first preferred embodiment;

FIG. 7 shows values of some optical parameters corresponding to the imaging lens of the second preferred embodiment;

FIG. 8 shows values of some parameters of an optical relationship corresponding to the imaging lens of the second preferred embodiment;

FIG. 11 shows values of some optical parameters corresponding to the imaging lens of the third preferred embodiment;

FIG. 12 shows values of some parameters of an optical relationship corresponding to the imaging lens of the third preferred embodiment;

FIG. 15 shows values of some optical parameters corresponding to the imaging lens of the fourth preferred embodiment;

FIG. 16 shows values of some parameters of an optical relationship corresponding to the imaging lens of the fourth preferred embodiment;

FIG. 19 shows values of some optical parameters corresponding to the imaging lens of the fifth preferred embodiment;

FIG. 20 shows values of some parameters of an optical relationship corresponding to the imaging lens of the fifth preferred embodiment;

FIG. 23 shows values of some optical parameters corresponding to the imaging lens of the sixth preferred embodiment;

FIG. 24 shows values of some parameters of an optical relationship corresponding to the imaging lens of the sixth preferred embodiment;

FIG. 27 shows values of some optical parameters corresponding to the imaging lens of the seventh preferred embodiment;

FIG. 28 shows values of some parameters of an optical relationship corresponding to the imaging lens of the seventh preferred embodiment;

FIG. 31 shows values of some optical parameters corresponding to the imaging lens of the eighth preferred embodiment;

FIG. 32 shows values of some parameters of an optical relationship corresponding to the imaging lens of the eighth preferred embodiment;

FIGS. 34 and 35 are tables each listing values of parameters of other optical relationships corresponding to the imaging lenses of the first to eighth preferred embodiments;

DETAILED DESCRIPTION OF THE PREFERRED EMBODIMENTS

Figure 1:
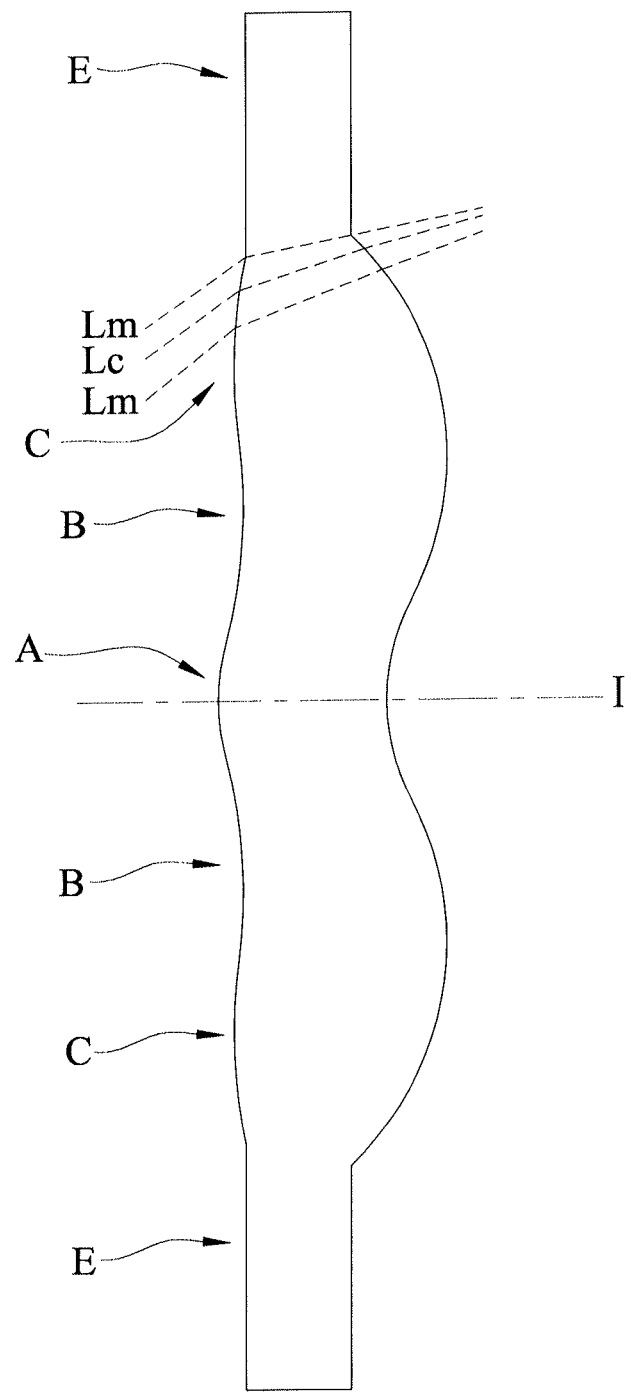
FIG. 1 is a schematic diagram to illustrate the structure of a lens element.

Before the present invention is described in greater detail, it should be noted that like elements are denoted by the same reference numerals throughout the disclosure.

In the following description, "a lens element has a positive (or negative) refractive power" means the lens element has a positive (or negative) refractive power in a vicinity of an optical axis thereof. "An object-side surface (or image-side surface) has a convex (or concave) portion at a certain area" means that, compared to a radially exterior area adjacent to said certain area, said certain area is more convex (or concave) in a direction parallel to the optical axis. Referring to FIG. 1 as an example, the lens element is radially symmetrical with respect to an optical axis (I) thereof. The object-side surface of the lens element has a convex portion at an area A, a concave portion at an area B, and a convex portion at an area C. This is because the area A is more convex in a direction parallel to the optical axis (I) in comparison with a radially exterior area thereof (i.e., area B), the area B is more concave in comparison with the area C, and the area C is more convex in comparison with an area E. "In a vicinity of a periphery" refers to an area around a periphery of a curved surface of the lens element for passage of imaging light only, which is the area C in FIG. 1. The imaging light includes a chief ray Lc and a marginal ray Lm. "In a vicinity of the optical axis" refers to an area around the optical axis of the curved surface for passage of the imaging light only, which is the area A in FIG. 1. In addition, the lens element further includes an extending portion E for installation into an optical imaging lens device. Ideally, the imaging light does not pass through the extending portion E. The structure and shape of the extending portion E are not limited herein. In the following embodiments, the extending portion E is not depicted in the drawings for the sake of clarity.

Figure 2:
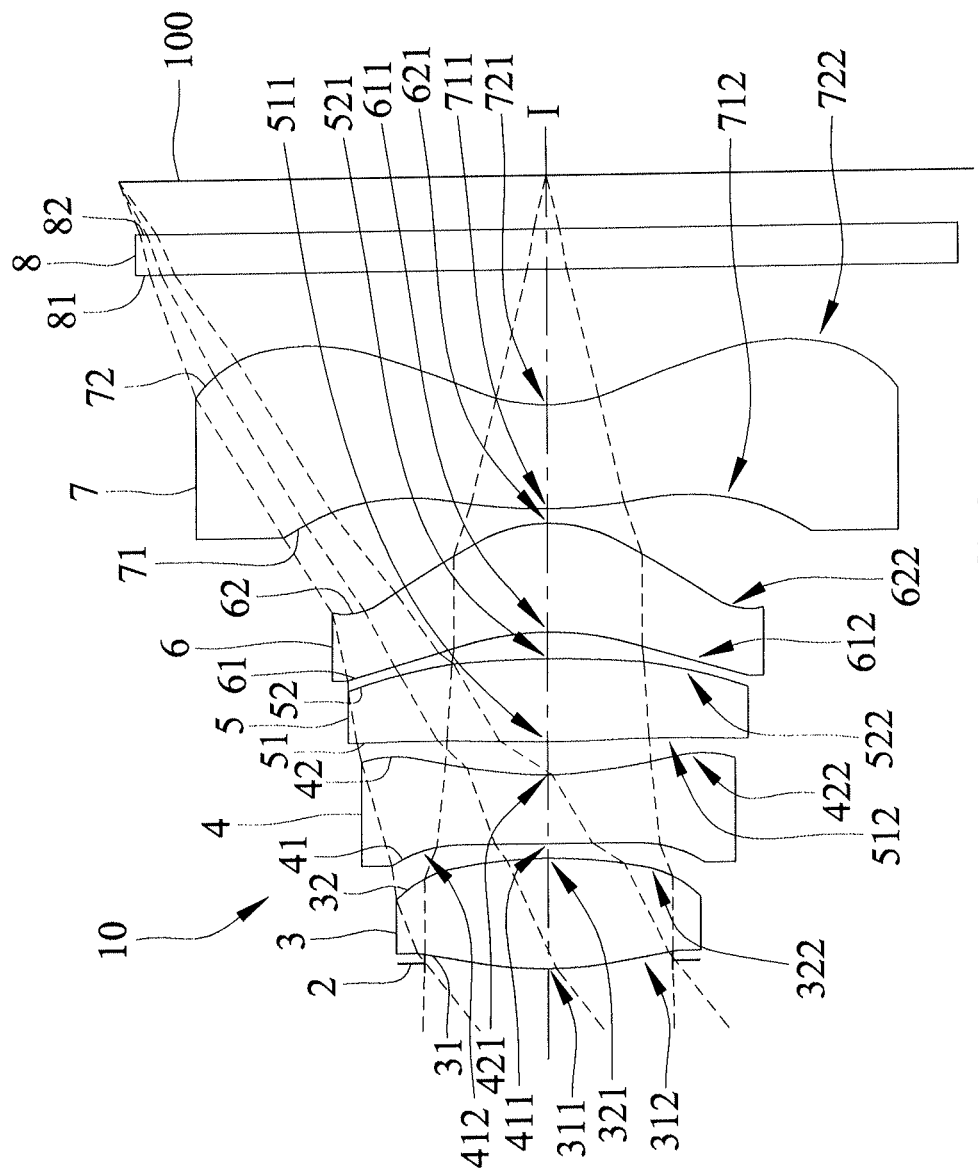
FIG. 2 is a schematic diagram that illustrates the first preferred embodiment of an imaging lens according to the present invention.

Referring to FIG. 2, the first preferred embodiment of an imaging lens 10 according to the present invention includes an aperture stop 2, a first lens element 3, a second lens element 4, a third lens element 5, a fourth lens element 6, a fifth lens elements 7, and an optical filter 8 arranged in the given order along an optical axis (I) from an object side to an image side. The optical filter 8 is an infrared cut filter for selectively absorbing infrared light to thereby reduce imperfection of images formed at an image plane 100.

Each of the first, second, third, fourth and fifth lens elements 3-7 and the optical filter 8 has an object-side surface 31, 41, 51, 61, 71, 81 facing toward the object side, and an image-side surface 32, 42, 52, 62, 72, 82 facing toward the image side. Light entering the imaging lens 10 travels through the aperture stop 2, the object-side and image-side surfaces 31, 32 of the first lens element 3, the object-side and image-side surfaces 41, 42 of the second lens element 4, the object-side and image-side surfaces 51, 52 of the third lens element 5, the object-side and image-side surfaces 61, 62 of the fourth lens element 6, the object-side and image-side surfaces 71, 72 of the fifth lens element 7, and the object-side and image-side surfaces 81, 82 of the optical filter 8, in the given order, to form an image on the image plane 100. Each of the object-side surfaces 31, 41, 51, 61, 71 and the image-side surfaces 32, 42, 52, 62, 72 is aspherical and has a center point coinciding with the optical axis (I).

The lens elements 3-7 are made of a plastic material in this embodiment, and at least one of the lens elements 3-6 may be made of other materials in other embodiments. In addition, each of the lens elements 3-7 has a refractive power.

In the first preferred embodiment, which is depicted in FIG. 2, the first lens element 3 has a positive refractive power. The object-side surface 31 of the first lens element 3 is a convex surface that has a convex portion 311 in a vicinity of the optical axis (I) and a convex portion 312 in a vicinity of a periphery of the first lens element 3. The image-side surface 32 of the first lens element 3 is a convex surface that has a convex portion 321 in a vicinity of the optical axis (I), and a convex portion 322 in a vicinity of the periphery of the first lens element 3.

The second lens element 4 has a negative refractive power. The object-side surface 41 of the second lens element 4 has a convex portion 411 in a vicinity of the optical axis (I), and a concave portion 412 in a vicinity of a periphery of the second lens element 4. The image-side surface 42 of the second lens element 4 has a concave portion 421 in a vicinity of the optical axis (I), and a convex portion 422 in a vicinity of the periphery of the second lens element 4.

The third lens element 5 has a positive refractive power. The object-side surface 51 of the third lens element 5 has a convex portion 511 in a vicinity of the optical axis (I), and a concave portion 512 in a vicinity of a periphery of the third lens element 5. The image-side surface 52 of the third lens element 5 has a convex portion 521 in a vicinity of the optical axis (I), and a convex portion 522 in a vicinity of the periphery of the third lens element 5.

The fourth lens element 6 has a positive refractive power. The object-side surface 61 of the fourth lens element 6 has a concave portion 611 in a vicinity of the optical axis (I), and a concave portion 612 in a vicinity of a periphery of the fourth lens element 6. The image-side surface 62 of the fourth lens element 6 has a convex portion 621 in a vicinity of the optical axis (I), and a concave portion 622 in a vicinity of the periphery of the fourth lens element 6.

The fifth lens element 7 has a negative refractive power. The object-side surface 71 of the fifth lens element 7 has a convex portion 711 in a vicinity of the optical axis (I), and a concave portion 712 in a vicinity of a periphery of the fifth lens element 7. The image-side surface 72 of the fifth lens element 7 has a concave portion 721 in a vicinity of the optical axis (I), and a convex portion 722 in a vicinity of the periphery of the fifth lens element 7.

In the first preferred embodiment, the imaging lens 10 does not include any lens element with refractive power other than the aforesaid lens elements 3-7.

Shown in FIG. 3 is a table that lists values of some optical parameters corresponding to the surfaces 31, 41, 51, 61, 71, 81, 32, 42, 52, 62, 72, and 82 of the first preferred embodiment. The imaging lens 10 has an overall system effective focal length (EFL) of 2.724 mm, a half field-of-view (HFOV) of 39.383°, an F-number of 2.07, and a system length of 4.025 mm. The system length refers to a distance between the object-side surface 31 of the first lens element 3 and the image plane 100 at the optical axis (I).

In this embodiment, each of the object-side surfaces 31, 41, 51, 61, and 71, and the image-side surfaces 32, 42, 52, 62, and 72 is aspherical, and satisfies the optical relationship of $$Z(Y) = \frac{Y^2}{R} \bigg/ \left(1 + \sqrt{1-(1+K)\frac{Y^2}{R^2}}\right) + \sum_{i=1}^{n} a_{2i} \times Y^{2i} \quad (1)$$

where:

Y represents a perpendicular distance between an arbitrary point on an aspherical surface and the optical axis (I);

Z represents a depth of the aspherical surface, which is defined as a perpendicular distance between the arbitrary point on the aspherical surface that is spaced apart from the optical axis (I) by a distance Y, and a tangent plane at a vertex of the aspherical surface at the optical axis (I);

R represents a radius of curvature of the aspherical surface;

K represents a conic constant; and $a_{2i}$ represents a $2i^{th}$ aspherical coefficient.

Shown in FIG. 4 is a table that lists values of some optical parameters of the aforementioned optical relationship (1) corresponding to the first preferred embodiment.

Relationships among some of the aforementioned optical parameters corresponding to the first preferred embodiment are as follows:

T1=0.556; G12=0.080; T2=0.348; G23=0.160; T3=0.416; G34=0.147; T4=0.544; G45=0.079; T5=0.525; G5F=0.689; TF=0.210; GFP=0.272; ALT=2.389; Gaa=0.466; BFL=1.171; T1/T3=1.337; G34/G23=0.919; ALT/T3=5.743; BFL/T1=2.106; BFL/(G12+G23)=4.879; ALT/G34=16.252; (T3+T5)/G23=5.881; (T4+T5)/(G12+G45)=6.723; (T4+T5)/G34=7.272; (T1+T5)/G34=7.354; (T3+T4)/(G12+G45)=6.038; ALT/G23=14.931; (T1+T5)/T2=3.106; (T3+T4)/T2=2.759; and (T3+T5)/G34=6.401 where:

T1 represents a thickness of the first lens element 3 at the optical axis (I);

T2 represents a thickness of the second lens element 4 at the optical axis (I);

T3 represents a thickness of the third lens element 5 at the optical axis (I);

T4 represents a thickness of the fourth lens element 6 at the optical axis (I);

T5 represents a thickness of the fifth lens element 7 at the optical axis (I);

G12 represents an air gap length between the first lens element 3 and the second lens element 4 at the optical axis (I);

G23 represents an air gap length between the second lens element 4 and the third lens element 5 at the optical axis (I);

G34 represents an air gap length between the third lens element 5 and the fourth lens element 6 at the optical axis (I);

G45 represents an air gap length between the fourth lens element 6 and the fifth lens element 7 at the optical axis (I);

G5F represents an air gap length between the fifth lens element 7 and the optical filter 8 at the optical axis (I);

GFP represents an air gap length between the optical filter 8 and the image plane 100 at the optical axis (I);

TF represents a thickness of the optical filter 8 at the optical axis (I);

ALT represents a sum of thicknesses of the first lens element 3, the second lens element 4, the third lens element 5, the fourth lens element 6 and the fifth lens element 7 at the optical axis (I), i.e., a sum of T1, T2, T3, T4 and T5;

Gaa represents a sum of air gap lengths among the first lens element 3, the second lens element 4, the third lens element 5, the fourth lens element 6, and the fifth lens element 7 at the optical axis (I), i.e., a sum of G12, G23, G34, and G45; and BFL represents a distance at the optical axis (I) between the image-side surface 72 of the fifth lens element 7 and the image plane 100.

FIGS. 5(a) to 5(d) respectively show simulation results corresponding to longitudinal spherical aberration, sagittal astigmatism aberration, tangential astigmatism aberration, and distortion aberration of the first preferred embodiment. In each of the simulation results, curves corresponding respectively to wavelengths of 470 nm, 555 nm, and 650 nm are shown.

It can be understood from FIG. 5(a) that, since each of the curves corresponding to longitudinal spherical aberration has a focal length at each field of view (indicated by the vertical axis) that falls within the range of ±0.015 mm, the first preferred embodiment is able to achieve a relatively low spherical aberration at each of the wavelengths. Furthermore, since the curves at each field of view are close to each other, the first preferred embodiment has a relatively low chromatic aberration.

It can be understood from FIGS. 5(b) and 5(c) that, since each of the curves falls within the range of ±0.06 mm of focal length, the first preferred embodiment has a relatively low optical aberration.

Figure 5:
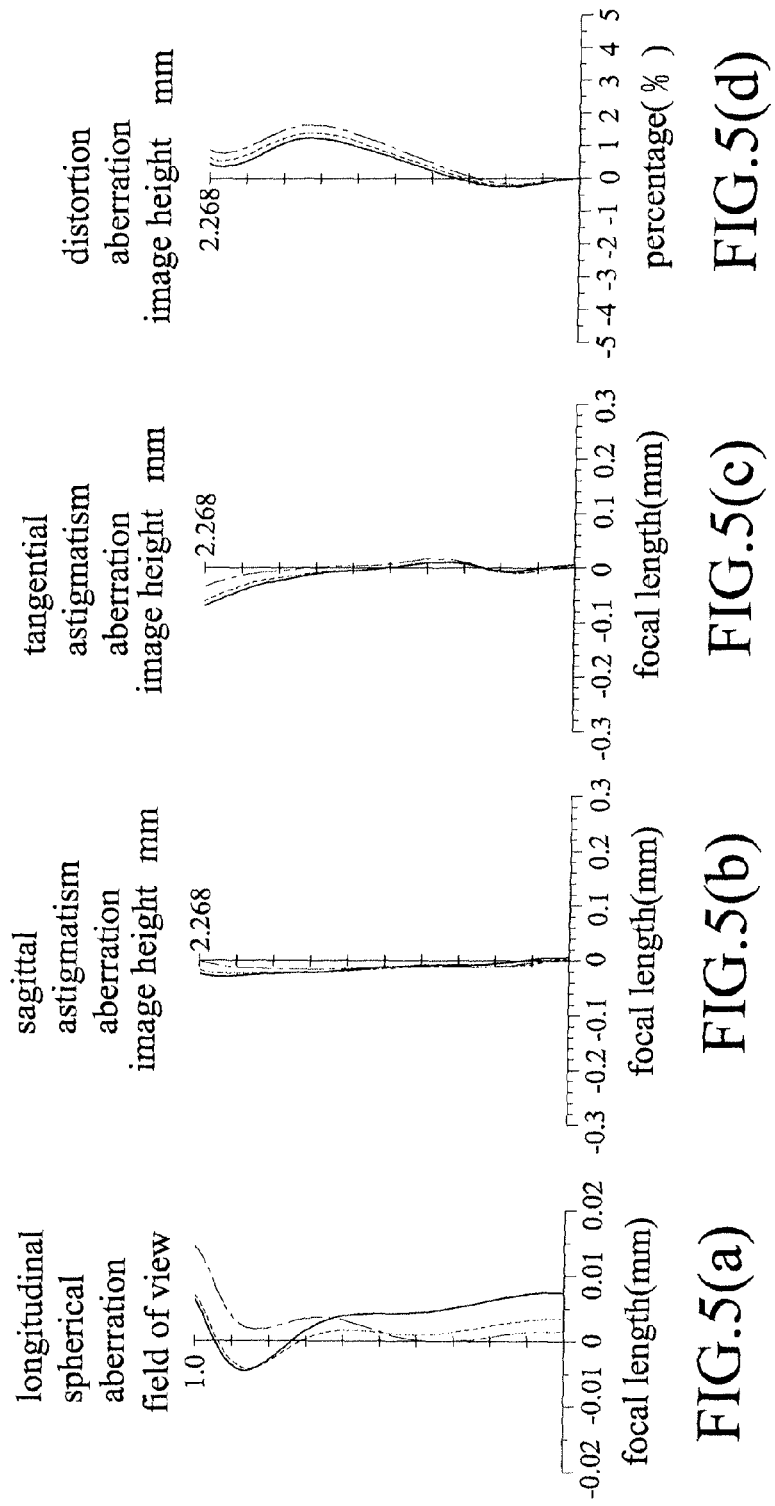
FIGS. 5(a) to 5(d) show different optical characteristics of the imaging lens of the first preferred embodiment.

Moreover, as shown in FIG. 5 (d), since each of the curves corresponding to distortion aberration falls within the range of ±2%, the first preferred embodiment is able to meet requirements in imaging quality of most optical systems.

In view of the above, even with the system length reduced down to 4.025 mm, the imaging lens 10 of the first preferred embodiment is still able to achieve a relatively good optical performance.

Figure 6:
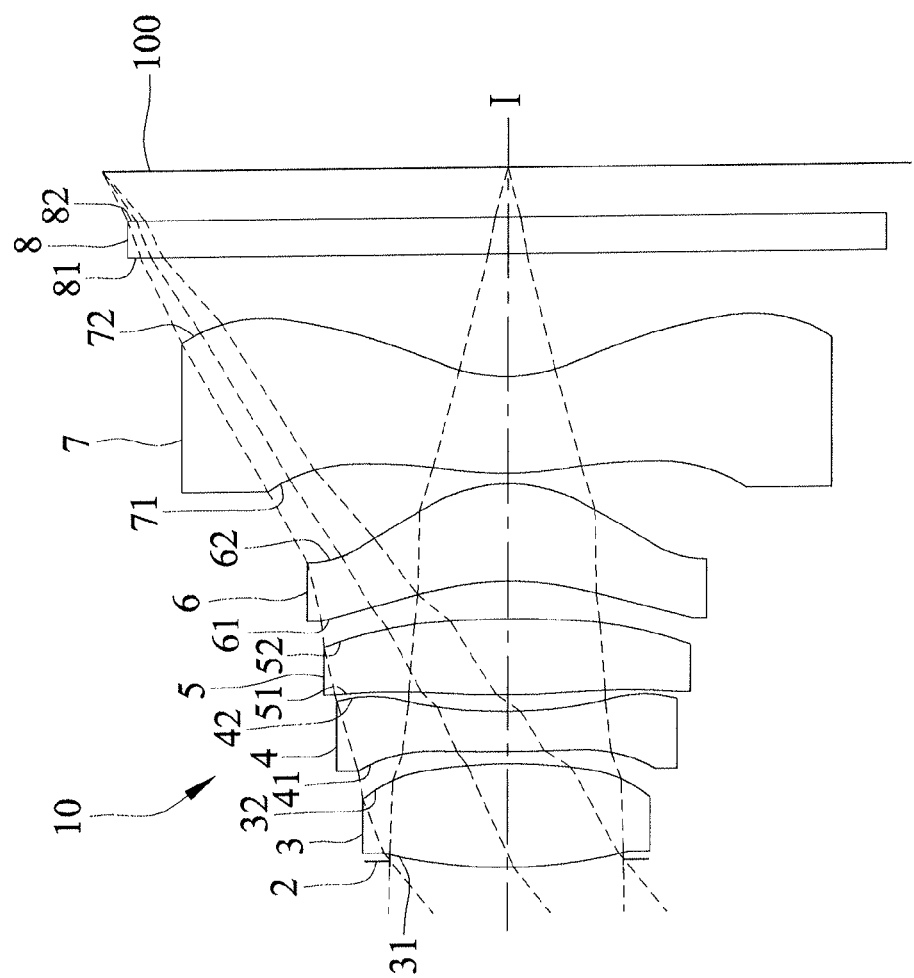
FIG. 6 is a schematic diagram that illustrates the second preferred embodiment of an imaging lens according to the present invention.
Figure 9:
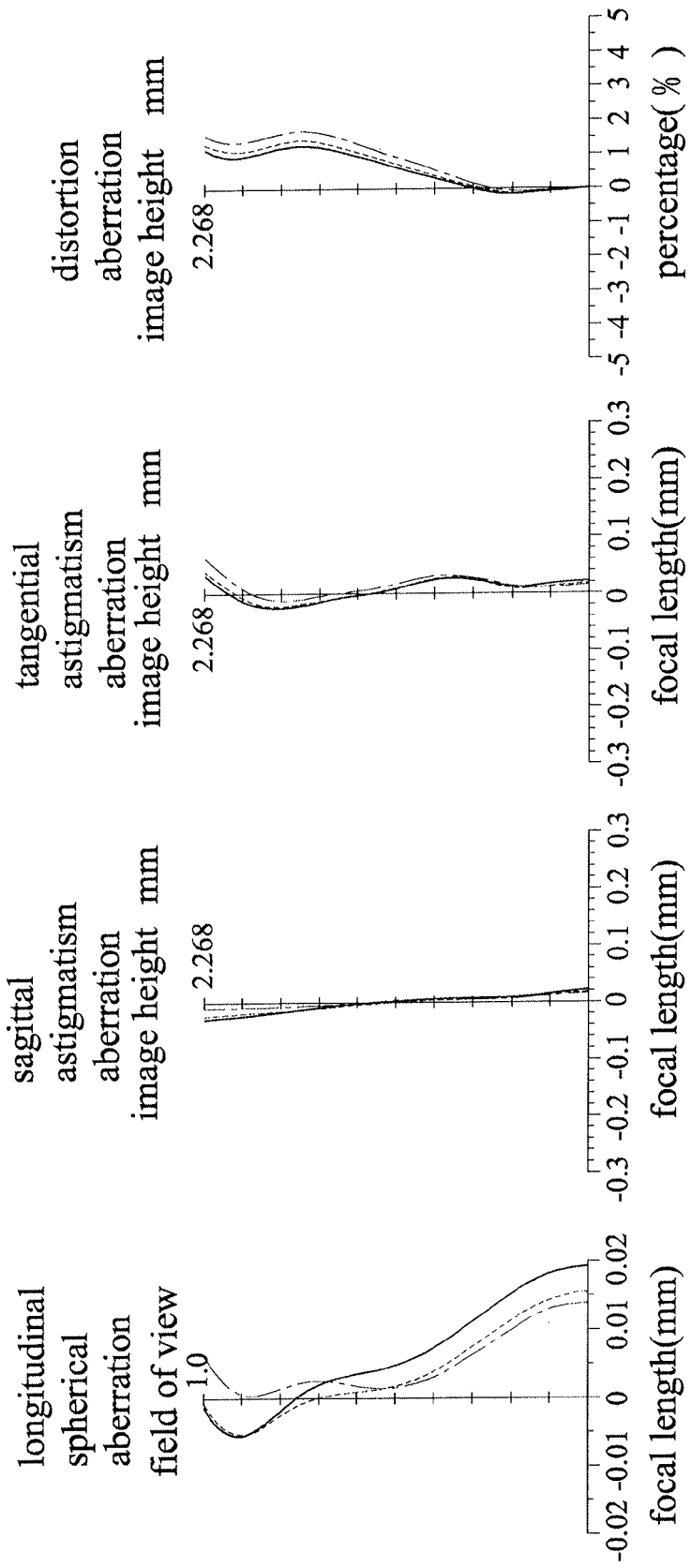
FIGS. 9(a) to 9(d) show different optical characteristics of the imaging lens of the second preferred embodiment.

Referring to FIG. 6, the differences between the first and second preferred embodiments of the imaging lens 10 of this invention reside in modifications of some optical data, aspherical coefficients and the lens parameters of the lens elements 3-7.

Shown in FIG. 7 is a table that lists values of some optical parameters corresponding to the surfaces 31, 41, 51, 61, 71, 81, 32, 42, 52, 62, 72, and 82 of the second preferred embodiment. The imaging lens 10 has an overall system focal length of 2.691 mm, an HFOV of 39.658°, an F-number of 2.058, and a system length of 3.925 mm.

Shown in FIG. 8 is a table that lists values of some optical parameters of the aforementioned optical relationship (1) corresponding to the second preferred embodiment.

Relationships among some of the aforementioned optical parameters corresponding to the second preferred embodiment are as follows:

T1=0.575; G12=0.081; T2=0.215; G23=0.097; T3=0.414; G34=0.221; T4=0.542; G45=0.062; T5=0.541; G5F=0.689; TF=0.210; GFP=0.278; ALT=2.287; Gaa=0.461; BFL=1.177; T1/T3=1.389; G34/G23=2.278; ALT/T3=5.524; BFL/T1=2.047; BFL/(G12+G23)=6.612; ALT/G34=10.348; (T3+T5)/G23=9.845; (T4+T5)/(G12+G45)=7.573; (T4+T5)/G34=4.900; (T1+T5)/G34=5.050; (T3+T4)/(G12+G45)=6.685; ALT/G23=23.577; (T1+T5)/T2=5.191; (T3+T4)/T2=4.447; and (T3+T5)/G34=4.321

FIGS. 9(a) to 9(d) respectively show simulation results corresponding to longitudinal spherical aberration, sagittal astigmatism aberration, tangential astigmatism aberration, and distortion aberration of the second preferred embodiment. It can be understood from FIGS. 9(a) to 9(d) that the second preferred embodiment is able to achieve a relatively good optical performance.

Figure 10:
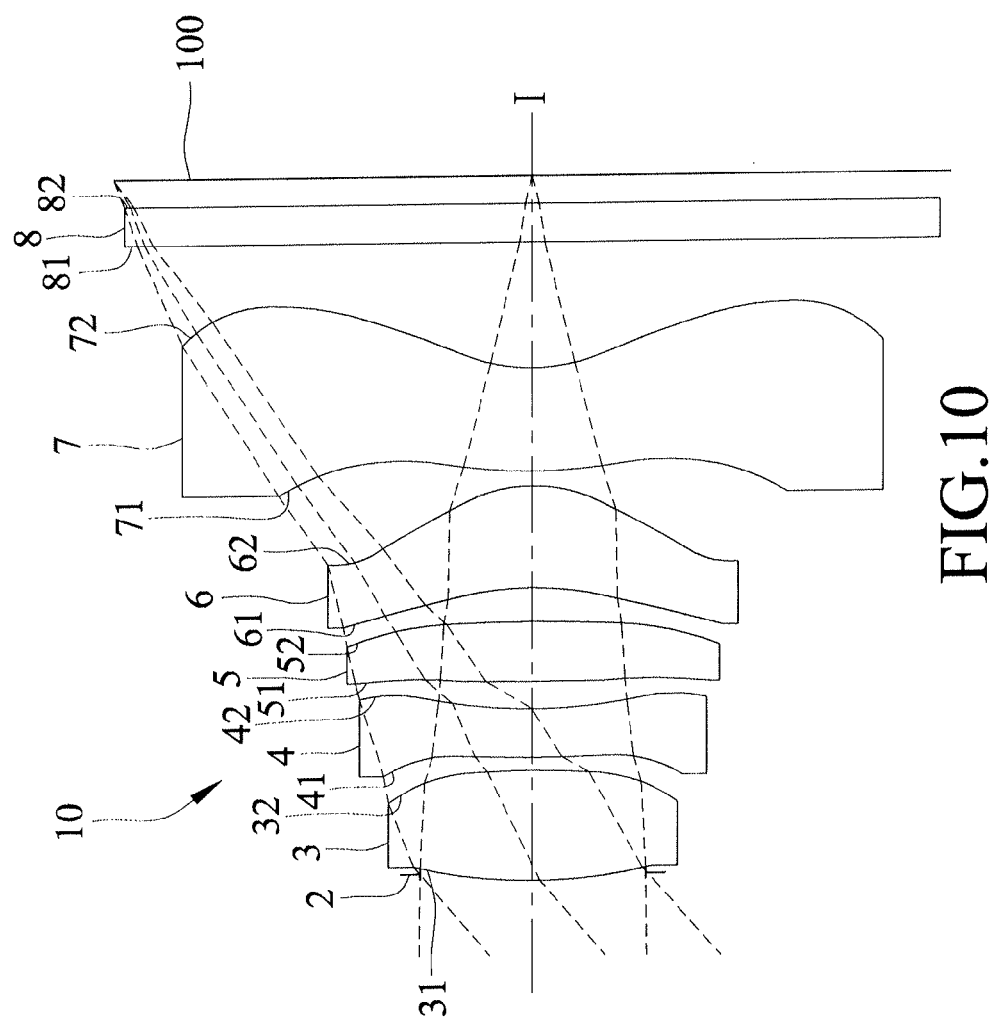
FIG. 10 is a schematic diagram that illustrates the third preferred embodiment of an imaging lens according to the present invention.
Figure 13:
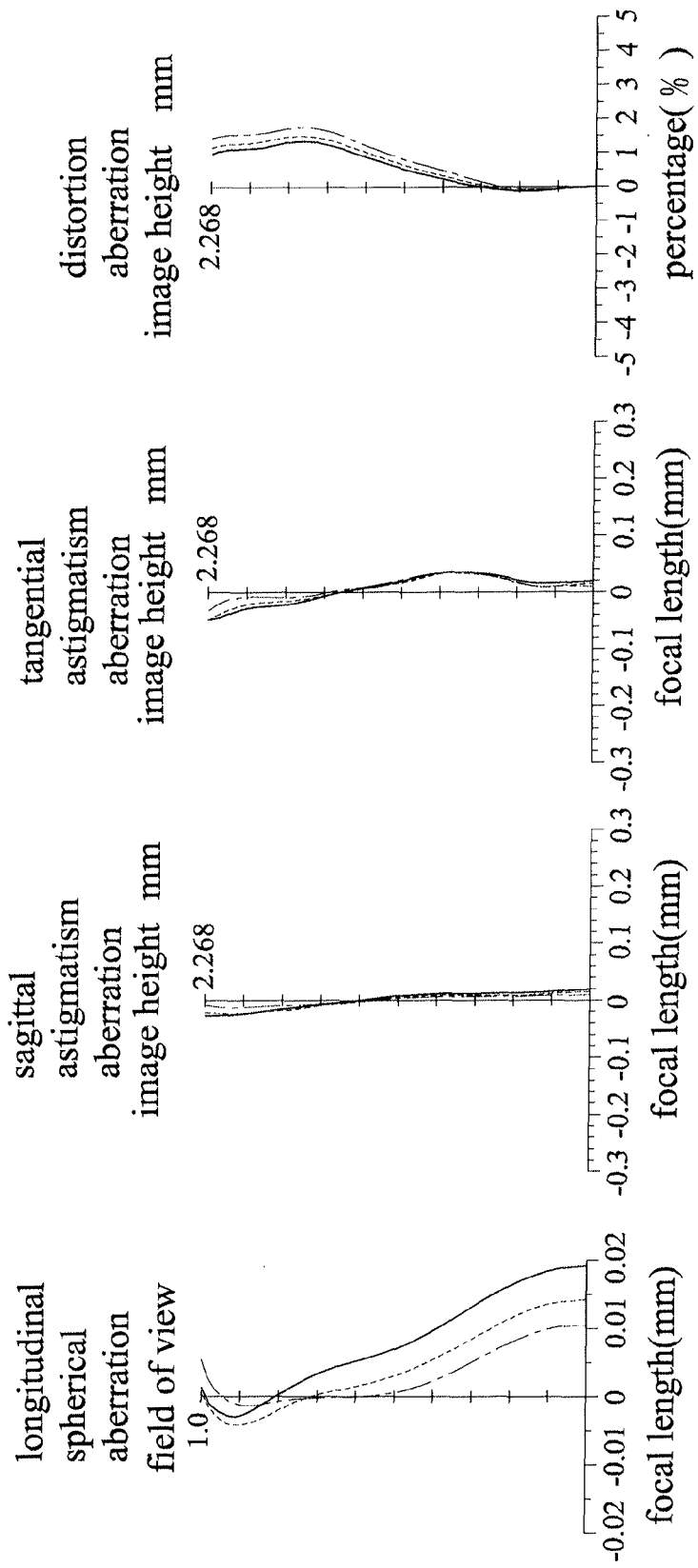
FIGS. 13(a) to 13(d) show different optical characteristics of the imaging lens of the third preferred embodiment.

Referring to FIG. 10, the differences between the first and third preferred embodiments of the imaging lens 10 of this invention reside in modifications of some optical data, aspherical coefficients and the lens parameters of the lens elements 3-7.

Shown in FIG. 11 is a table that lists values of some optical parameters corresponding to the surfaces 31, 41, 51, 61, 71, 81, 32, 42, 52, 62, 72, and 82 of the third preferred embodiment. The imaging lens 10 has an overall system focal length of 2.549 mm, an HFOV of 41.252°, an F-number of 2.067, and a system length of 3.815 mm.

Shown in FIG. 12 is a table that lists values of some optical parameters of the aforementioned optical relationship (1) corresponding to the third preferred embodiment.

Relationships among some of the aforementioned optical parameters corresponding to the third preferred embodiment are as follows:

T1=0.605; G12=0.078; T2=0.250; G23=0.144; T3=0.333; G34=0.178; T4=0.555; G45=0.080; T5=0.552; G5F=0.689; TF=0.210; GFP=0.143; ALT=2.295; Gaa=0.480; BFL=1.042; T1/T3=1.817; G34/G23=1.236; ALT/T3=6.892; BFL/T1=1.722; BFL/(G12+G23)=4.694; ALT/G34=12.893; (T3+T5)/G23=6.146; (T4+T5)/(G12+G45)=7.006; (T4+T5)/G34=6.219; (T1+T5)/G34=6.500; (T3+T4)/(G12+G45)=5.620; ALT/G23=15.938; (T1+T5)/T2=4.628; (T3+T4)/T2=3.552; and (T3+T5)/G34=4.972

FIGS. 13(a) to 13(d) respectively show simulation results corresponding to longitudinal spherical aberration, sagittal astigmatism aberration, tangential astigmatism aberration, and distortion aberration of the third preferred embodiment. It can be understood from FIGS. 13(a) to 13(d) that the third preferred embodiment is able to achieve a relatively good optical performance.

Figure 14:
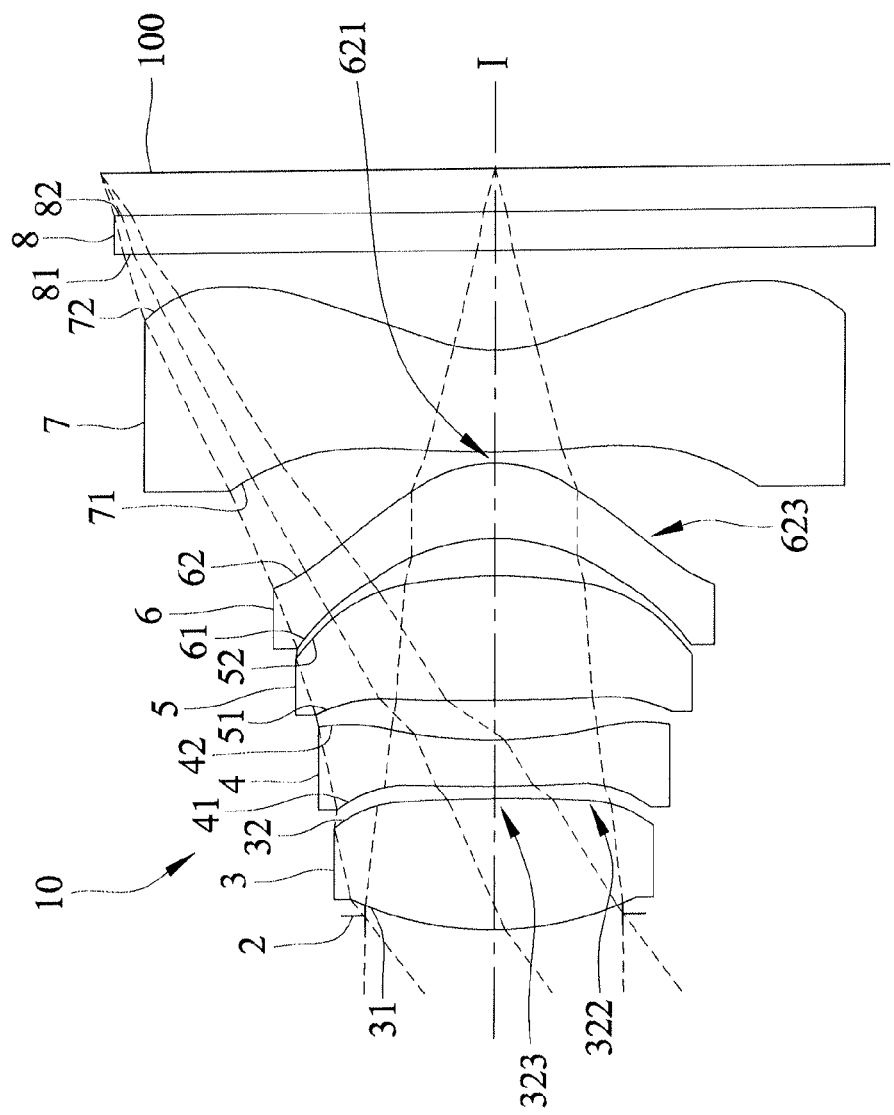
FIG. 14 is a schematic diagram that illustrates the fourth preferred embodiment of an imaging lens according to the present invention.
Figure 17:
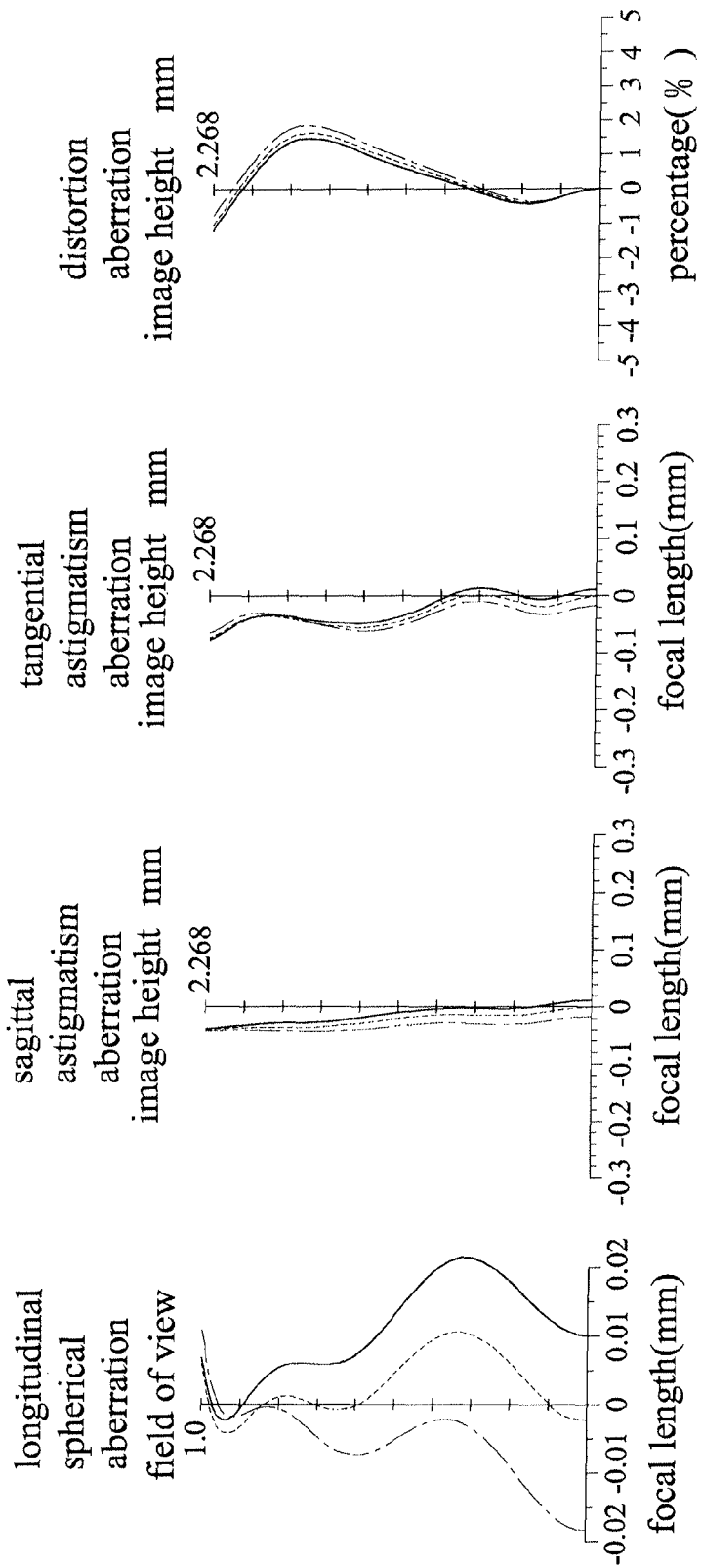
FIGS. 17(a) to 17(d) show different optical characteristics of the imaging lens of the fourth preferred embodiment.

Referring to FIG. 14, the differences between the first and fourth preferred embodiments of the imaging lens 10 of this invention reside in that: the image-side surface 32 of the first lens element 3 has a concave portion 323 in a vicinity of the optical axis (I), and a convex portion 322 in a vicinity of the periphery of the first lens element 3. The image-side surface 62 of the fourth lens element 6 has a convex portion 621 in a vicinity of the optical axis (I), and a convex portion 623 in a vicinity of the periphery of the fourth lens element 6.

Shown in FIG. 15 is a table that lists values of some optical parameters corresponding to the surfaces 31, 41, 51, 61, 71, 81, 32, 42, 52, 62, 72, and 82 of the fourth preferred embodiment. The imaging lens 10 has an overall system focal length of 2.981 mm, an HFOV of 37.220°, an F-number of 2.023, and a system length of 4.349 mm.

Shown in FIG. 16 is a table that lists values of some optical parameters of the aforementioned optical relationship (1) corresponding to the fourth preferred embodiment.

Relationships among some of the aforementioned optical parameters corresponding to the fourth preferred embodiment are as follows:

T1=0.744; 012=0.080; T2=0.260; G23=0.235; T3=0.701; 034=0.212; T4=0.431; G45=0.068; T5=0.573; G5F=0.580; TF=0.210; GFP=0.255; ALT=2.709; Gaa=0.595; BFL=1.045; T1/T3=1.061; G34/G23=0.902; ALT/T3=3.864; BFL/T1=1.405; BFL/(G12+G23)=3.317; ALT/G34=12.778; (T3+T5)/G23=5.421; (T4+T5)/(G12+G45)=6.784; (T4+T5)/G34=4.736; (T1+T5)/G34=6.212; (T3+T4)/(G12+G45)=7.649; ALT/G23=11.528; (T1+T5)/T2=5.065; (T3+T4)/T2=4.354; and (T3+T5)/G34=6.009

FIGS. 17(a) to 17(d) respectively show simulation results corresponding to longitudinal spherical aberration, sagittal astigmatism aberration, tangential astigmatism aberration, and distortion aberration of the fourth preferred embodiment. It can be understood from FIGS. 17 (a) to 17 (d) that the fourth preferred embodiment is able to achieve a relatively good optical performance.

Figure 18:
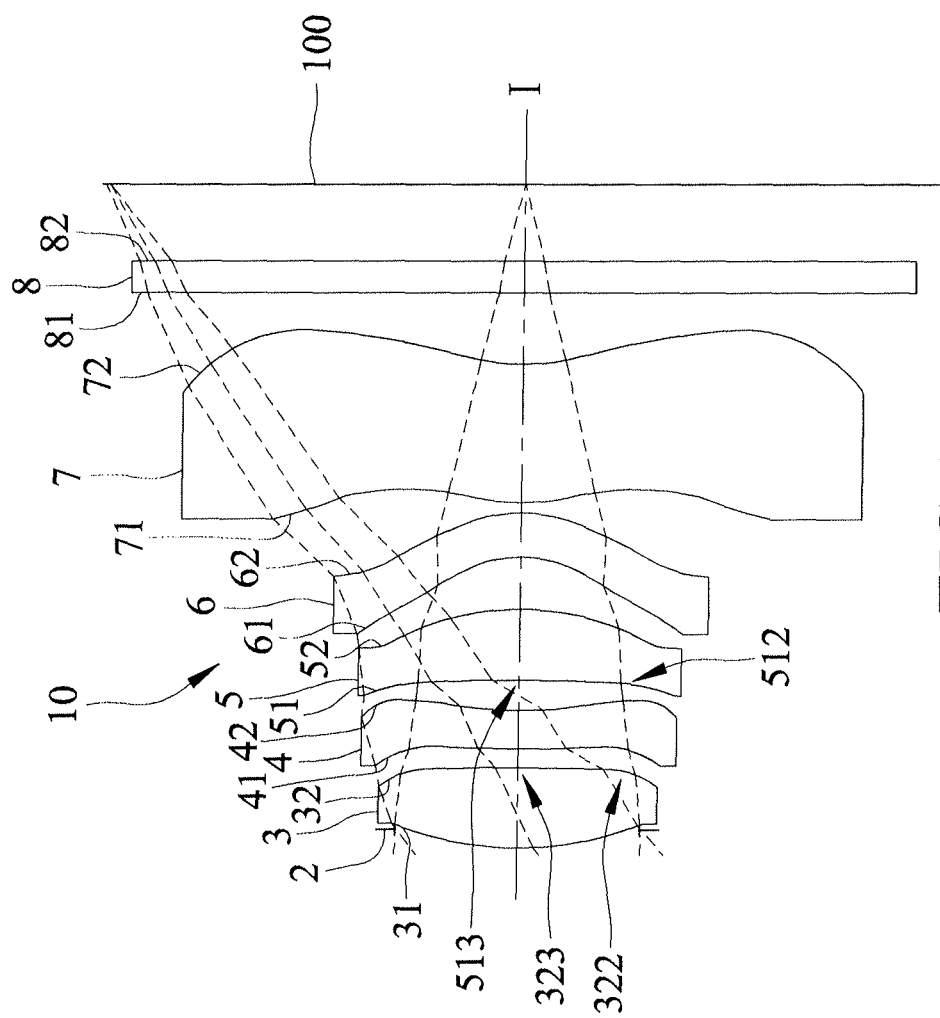
FIG. 18 is a schematic diagram that illustrates the fifth preferred embodiment of an imaging lens according to the present invention.
Figure 21:
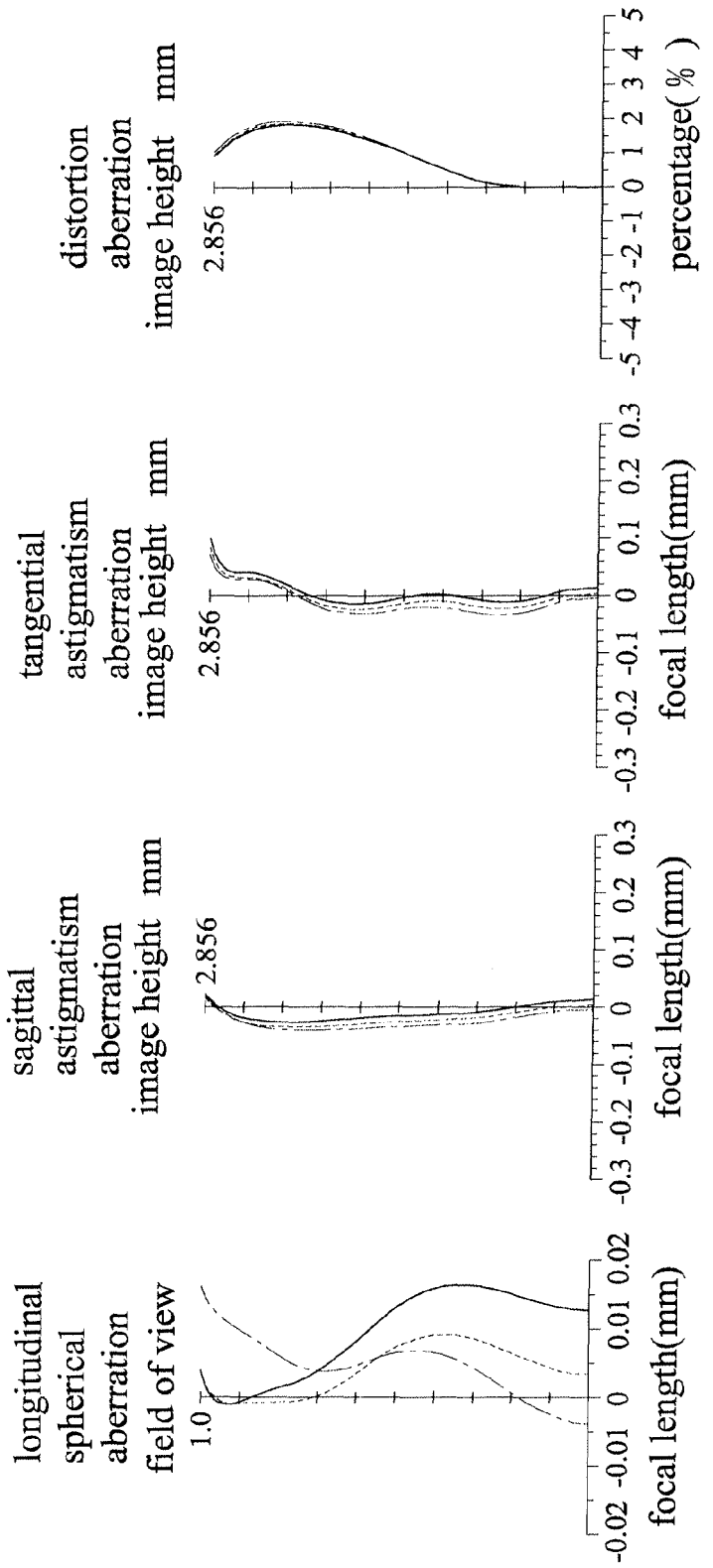
FIGS. 21(a) to 21(d) show different optical characteristics of the imaging lens of the fifth preferred embodiment.

Referring to FIG. 18, the differences between the first and fifth preferred embodiments of the imaging lens 10 of this invention reside in that: the image-side surface 32 of the first lens element 3 has a concave portion 323 in a vicinity of the optical axis (I) and a convex portion 322 in a vicinity of the periphery of the first lens element 3. The object-side surface 51 of the third lens element 5 has a concave portion 513 in a vicinity of the optical axis (I) and a concave portion 512 in a vicinity of the periphery of the third lens element 5. The fourth lens element 6 has a negative refractive power and the fifth lens element 7 has a positive refractive power.

Shown in FIG. 19 is a table that lists values of some optical parameters corresponding to the surfaces 31, 41, 51, 61, 71, 81, 32, 42, 52, 62, 72, and 82 of the fifth preferred embodiment. The imaging lens 10 has an overall system focal length of 3.390 mm, an HFOV of 39.865°, an F-number of 1.999, and a system length of 4.559 mm.

Shown in FIG. 20 is a table that lists values of some optical parameters of the aforementioned optical relationship (1) corresponding to the fifth preferred embodiment.

Relationships among some of the aforementioned optical parameters corresponding to the fifth preferred embodiment are as follows:

T1=0.552; G12=0.129; T2=0.260; G23=0.215; T3=0.485; G34=0.357; T4=0.300; G45=0.078; T5=0.942; G5F=0.500; TF=0.210; GFP=0.532; ALT=2.539; Gaa=0.779; BFL=1.242; T1/T3=1.137; G34/G23=1.657; ALT/T3=5.230; BFL/T1=2.249; BFL/(G12+G23)=3.607; ALT/G34=7.118; (T3+T5)/G23=6.629; (T4+T5)/(G12+G45)=6.006; (T4+T5)/G34=3.481; (T1+T5)/G34=4.187; (T3+T4)/(G12+G45)=3.799; ALT/G23=11.795; (T1+T5)/T2=5.745; (T3+T4)/T2=3.021; and (T3+T5)/G34=4.001

FIGS. 21(a) to 21(d) respectively show simulation results corresponding to longitudinal spherical aberration, sagittal astigmatism aberration, tangential astigmatism aberration, and distortion aberration of the fifth preferred embodiment. It can be understood from FIGS. 21(a) to 21(d) that the fifth preferred embodiment is able to achieve a relatively good optical performance.

Figure 22:
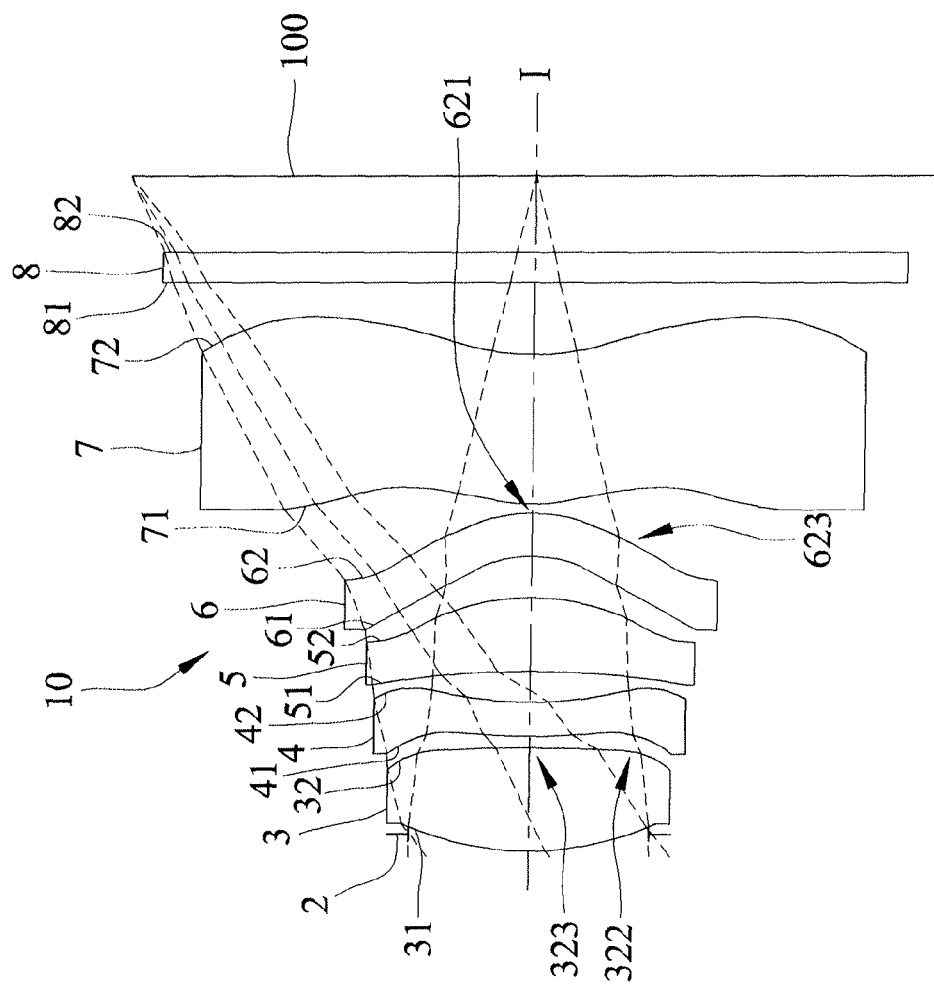
FIG. 22 is a schematic diagram that illustrates the sixth preferred embodiment of an imaging lens according to the present invention.
Figures 25A, 25B, 25C, 25D:
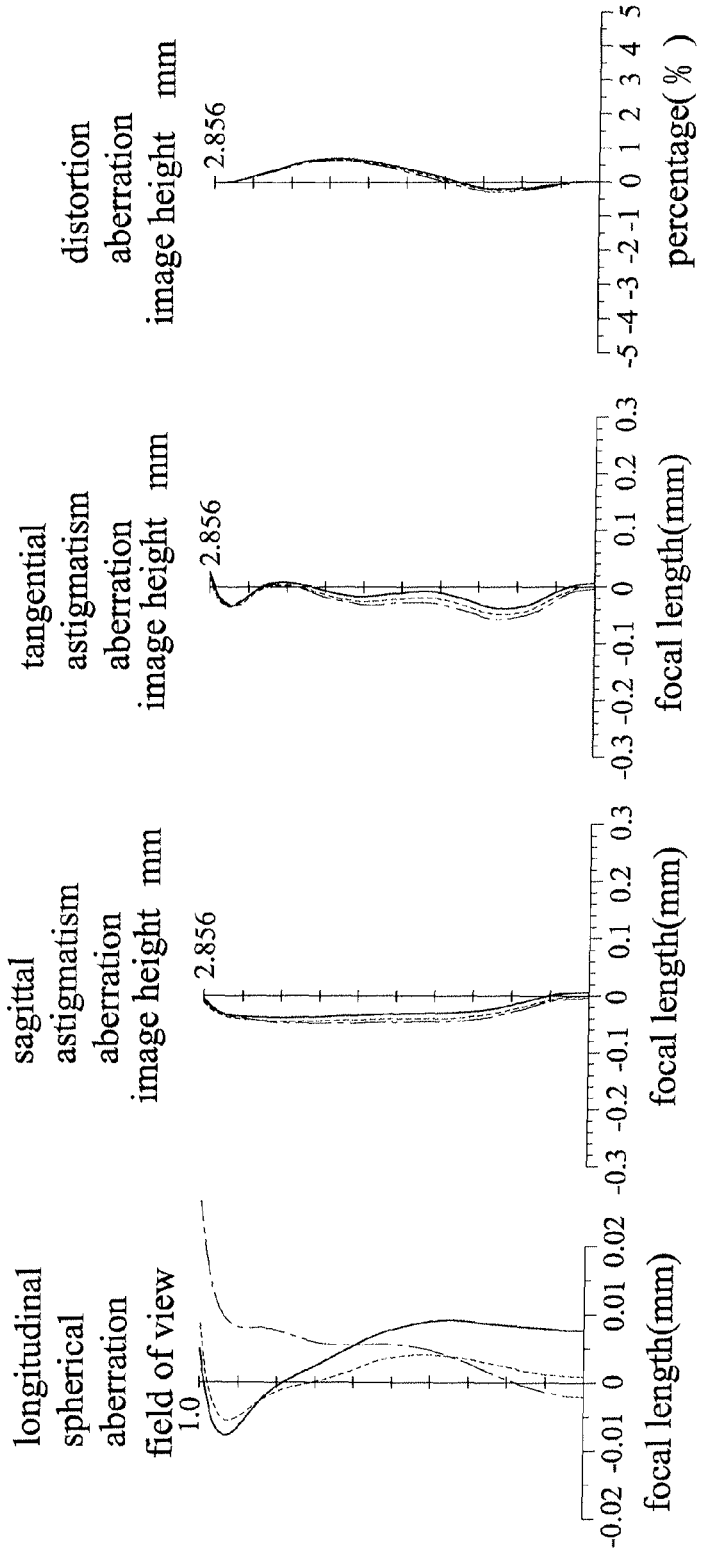
FIGS. 25(a) to 25(d) show different optical characteristics of the imaging lens of the sixth preferred embodiment.

FIG. 22 illustrates the sixth preferred embodiment of an imaging lens 10 according to the present invention, which has a configuration similar to that of the first preferred embodiment. The differences between the first and sixth preferred embodiments reside in that the image side surface 32 of the first lens element 3 has a concave portion 323 in a vicinity of the optical axis (I) and a convex portion 322 in a vicinity of the periphery of the first lens element 3. The fourth lens element 6 has a negative refractive power. The image side surface 62 of the fourth lens element 6 has a convex portion 621 in a vicinity of the optical axis (I) and a convex portion 623 in a vicinity of the periphery of the fourth lens element 6. The fifth lens element 7 has a positive refractive power.

Shown in FIG. 23 is a table that lists values of some optical parameters corresponding to the surfaces 31, 41, 51, 61, 71, 81, 32, 42, 52, 62, 72, and 82 of the sixth preferred embodiment. The imaging lens 10 has an overall system focal length of 3.412 mm, an HFOV of 39.938°, an F-number of 2.001, and a system length of 4.729 mm.

Shown in FIG. 24 is a table that lists values of some optical parameters of the aforementioned optical relationship (1) corresponding to the sixth preferred embodiment.

Relationships among some of the aforementioned optical parameters corresponding to the sixth preferred embodiment are as follows:

T1=0.719; G12=0.097; T2=0.231; G23=0.216; T3=0.512; G34=0.301; T4=0.295; G45=0.076; T5=1.037; G5F=0.500; TF=0.210; GFP=0.533; ALT=2.795; Gaa=0.692; BFL=1.243; T1/T3=1.405; G34/G23=1.393; ALT/T3=5.460; BFL/T1=1.728; BFL/(G12+G23)=3.961; ALT/G34=9.274; (T3+T5)/G23=7.160; (T4+T5)/(G12+G45)=7.661; (T4+T5)/G34=4.421; (T1+T5)/G34=5.828; (T3+T4)/(G12+G45)=4.641; ALT/G23=12.919; (T1+T5)/T2=7.594; (T3+T4)/T2=3.490; and (T3+T5)/G34=5.140

FIGS. 25(a) to 25(d) respectively show simulation results corresponding to longitudinal spherical aberration, sagittal astigmatism aberration, tangential astigmatism aberration, and distortion aberration of the sixth preferred embodiment. It can be understood from FIGS. 25(a) to 25(d) that the sixth preferred embodiment is able to achieve a relatively good optical performance.

Figure 26:
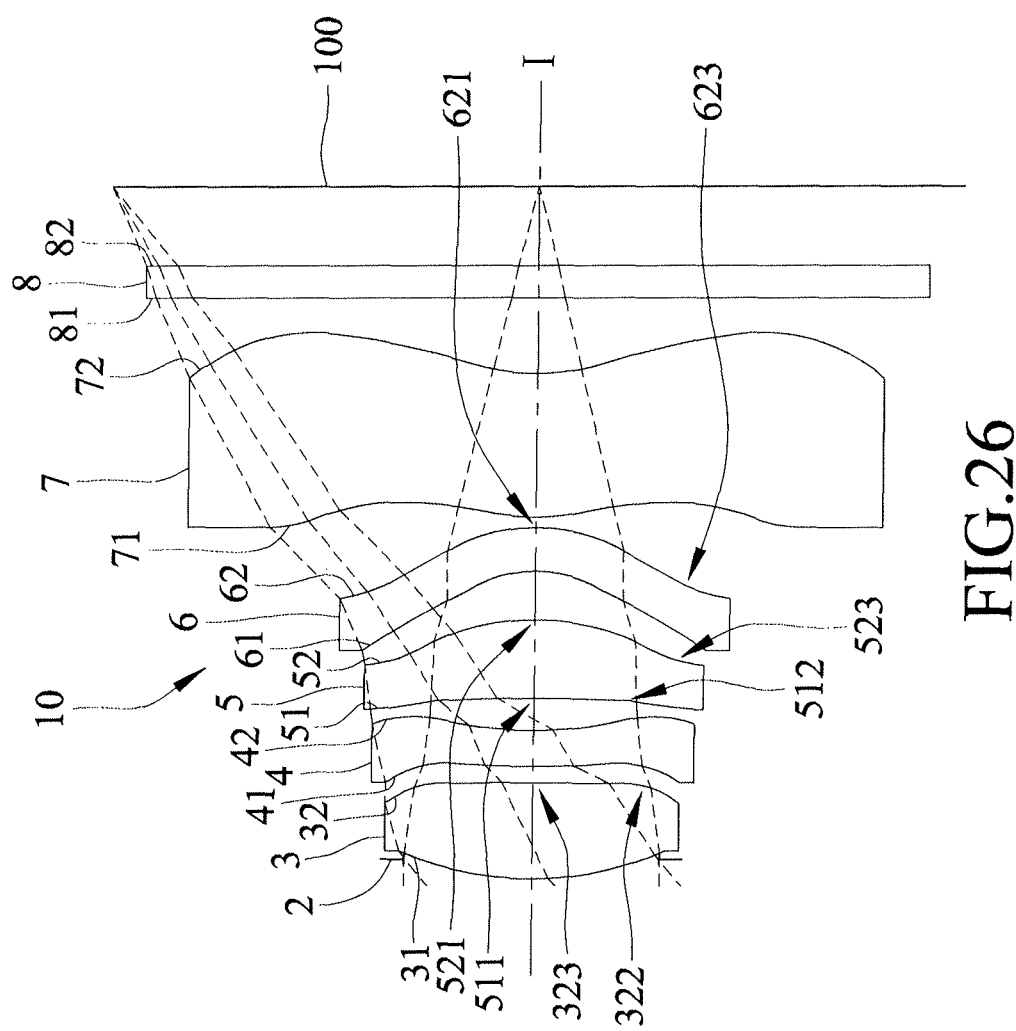
FIG. 26 is a schematic diagram that illustrates the seventh preferred embodiment of an imaging lens according to the present invention.
Figure 29:
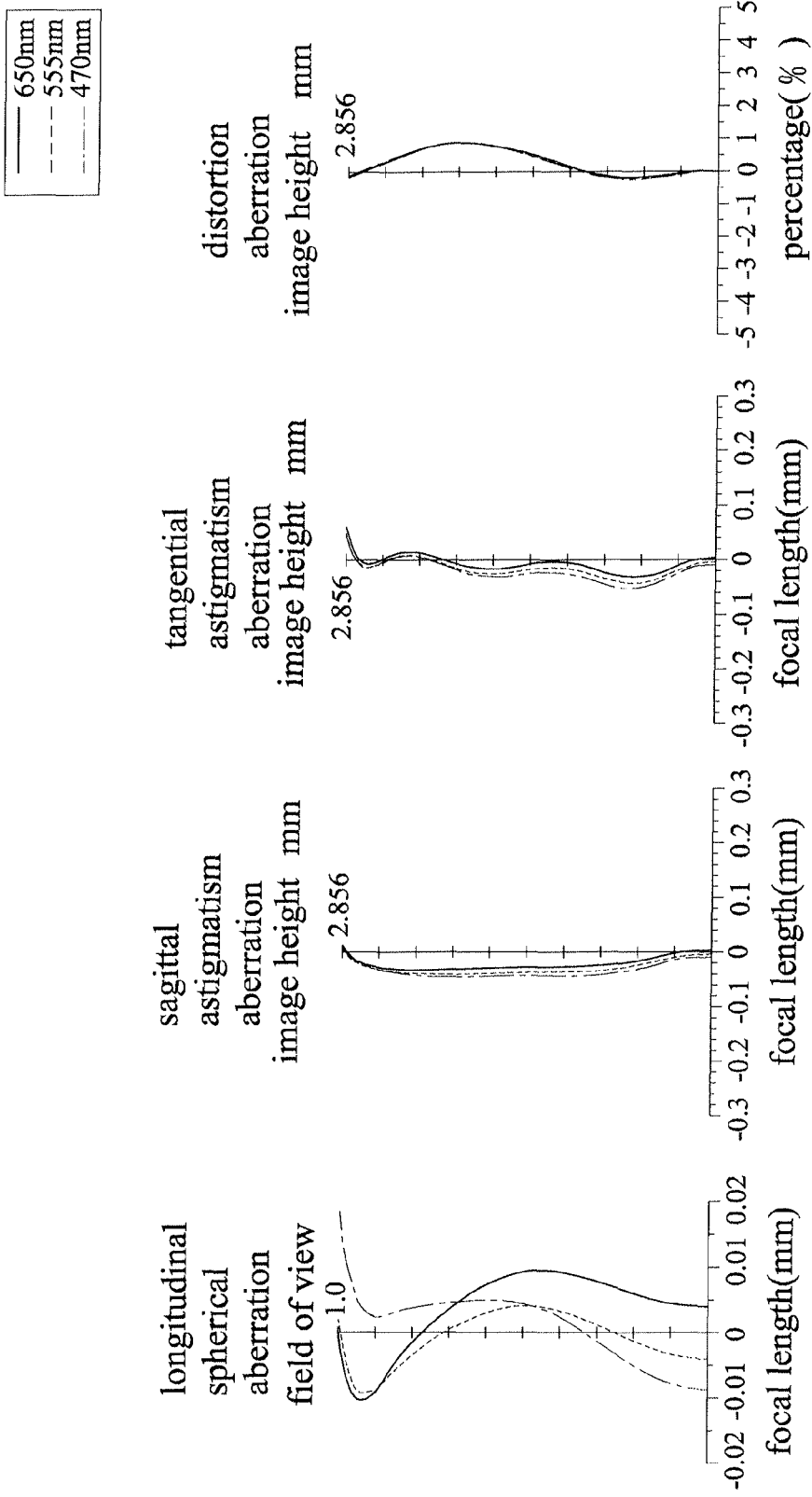
FIGS. 29(a) to 29(d) show different optical characteristics of the imaging lens of the seventh preferred embodiment.

Referring to FIG. 26, the differences between the first and seventh preferred embodiments of the imaging lens 10 of this invention reside in that: the image-side surface 32 of the first lens element 3 has a concave portion 323 in a vicinity of the optical axis (I) and a convex portion 322 in a vicinity of the periphery of the first lens element 3. The object-side surface 51 of the third lens element 5 has a concave portion 513 in a vicinity of the optical axis (I) and a concave portion 512 in a vicinity of the periphery of the third lens element 5. The image-side surface 52 of the third lens element 5 has a convex portion 521 in a vicinity of the optical axis (I) and a concave portion 523 in a vicinity of the periphery of the third lens element 5. The fourth lens element has a negative refractive power. The image-side surface 62 of the fourth lens element 6 has a convex portion 621 in a vicinity of the optical axis (I) and a convex portion 623 in a vicinity of the periphery of the fourth lens element 6. The fifth lens element 7 has a positive refractive power.

Shown in FIG. 27 is a table that lists values of some optical parameters corresponding to the surfaces 31, 41, 51, 61, 71, 81, 32, 42, 52, 62, 72, and 82 of the seventh preferred embodiment. The imaging lens 10 has an overall system focal length of 3.378 mm, an HFOV of 40.207°, an F-number of 2.001, and a system length of 4.628 mm.

Shown in FIG. 28 is a table that lists values of some optical parameters of the aforementioned optical relationship (1) corresponding to the seventh preferred embodiment.

Relationships among some of the aforementioned optical parameters corresponding to the seventh preferred embodiment are as follows:

T1=0.636; G12=0.120; T2=0.236; G23=0.213; T3=0.510; G34=0.334; T4=0.293; G45=0.074; T5=0.966; G5F=0.500; TF=0.210; GFP=0.535; ALT=2.641; Gaa=0.741; BFL=1.245; T1/T3=1.247; G34/G23=1.569; ALT/T3=5.178; BFL/T1=1.956; BFL/(G12+G23)=3.743; ALT/G34=7.903; (T3+T5)/G23=6.929; (T4+T5)/(G12+G45)=6.489; (T4+T5)/G34=3.767; (T1+T5)/G34=4.793; (T3+T4)/(G12+G45)=4.141; ALT/G23=12.400; (T1+T5)/T2=6.789; (T3+T4)/T2=3.405; and (T3+T5)/G34=4.416

FIGS. 29(a) to 29(d) respectively show simulation results corresponding to longitudinal spherical aberration, sagittal astigmatism aberration, tangential astigmatism aberration, and distortion aberration of the seventh preferred embodiment. It can be understood from FIGS. 29(a) to 29(d) that the seventh preferred embodiment is able to achieve a relatively good optical performance.

Figure 30:
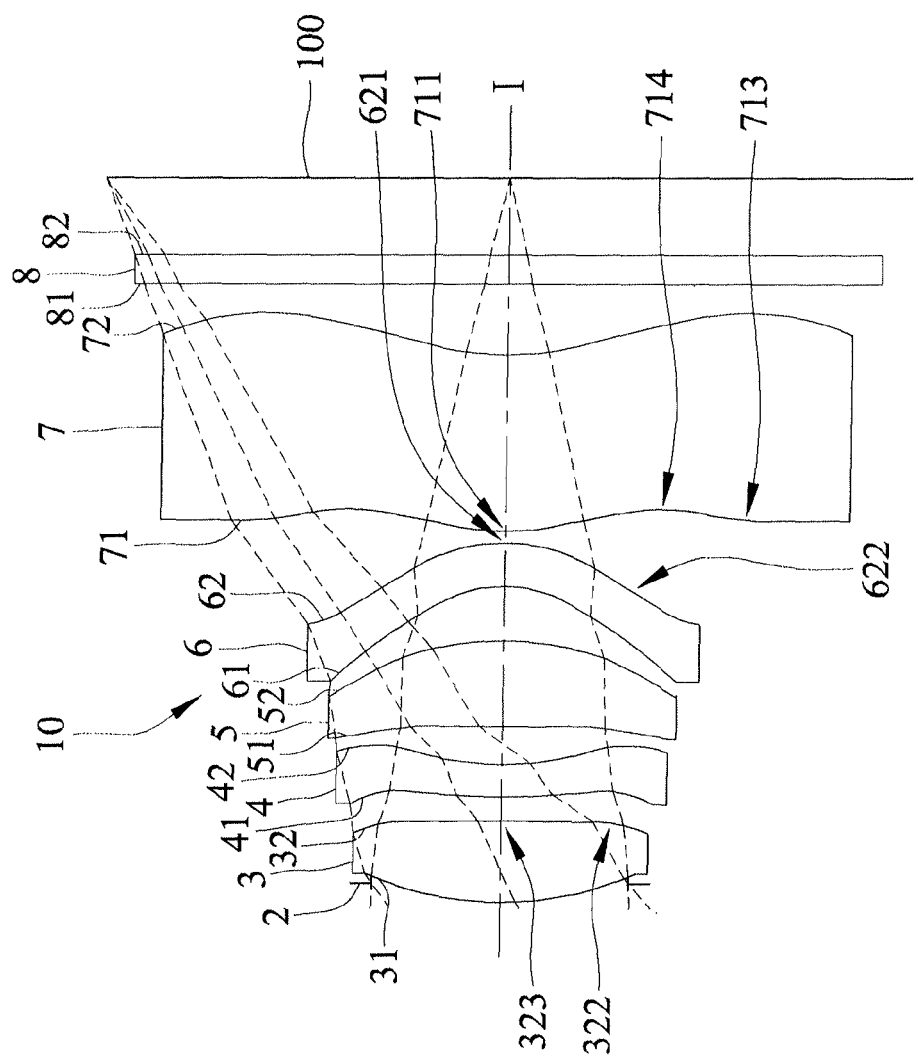
FIG. 30 is a schematic diagram that illustrates the eighth preferred embodiment of an imaging lens according to the present invention.
Figure 33:
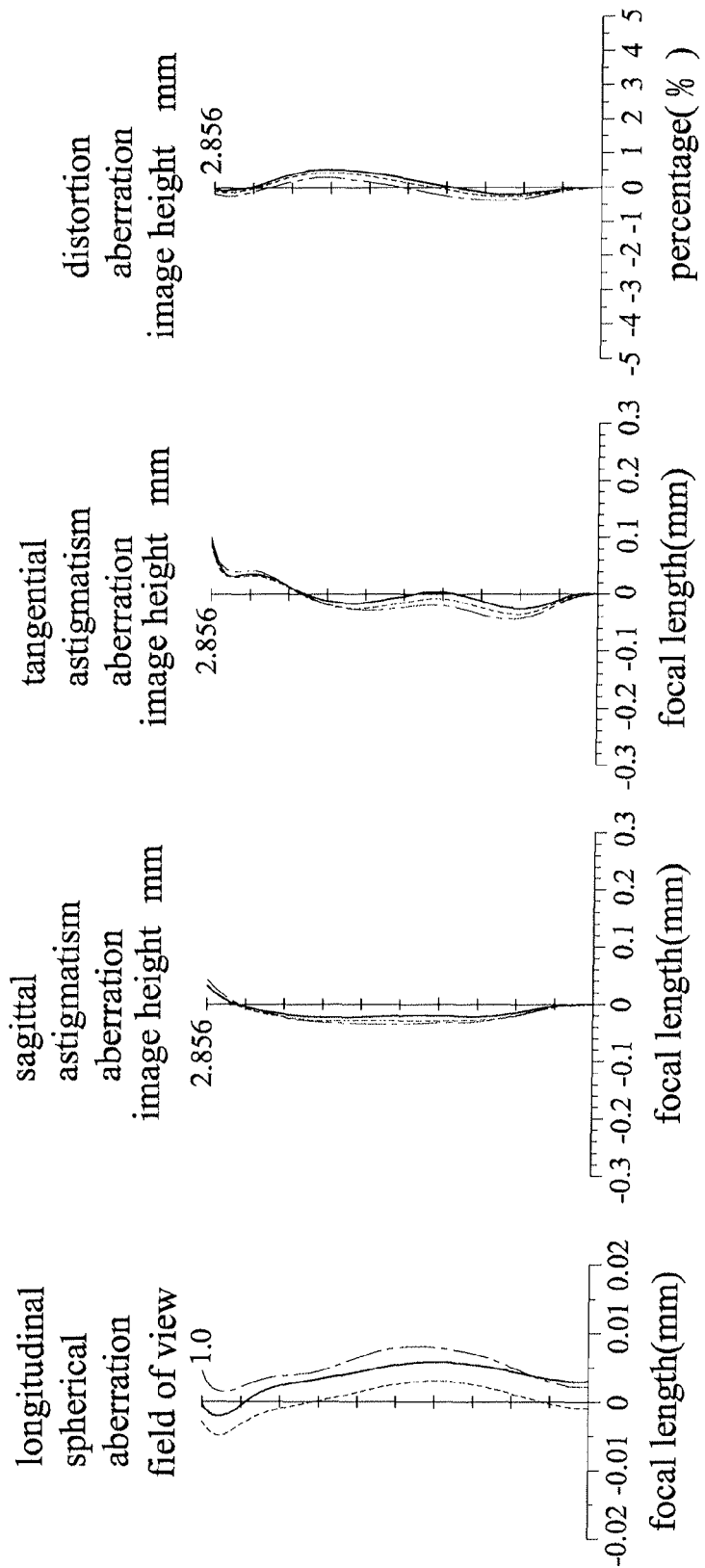
FIGS. 33(a) to 33(d) show different optical characteristics of the imaging lens of the eighth preferred embodiment.

Referring to FIG. 30, the differences between the first and eighth preferred embodiments of the imaging lens 10 of this invention reside in that: the image-side surface 32 of the first lens element 3 has a concave portion 323 in a vicinity of the optical axis (I) and a convex portion 322 in a vicinity of the periphery of the first lens element 3. The fourth lens element 6 has a negative refractive power. The image-side surface 62 of the fourth lens element 6 has a convex portion 621 in a vicinity of the optical axis (I) and a convex portion 623 in a vicinity of the periphery of the fourth lens element 6. The fifth lens element 7 has a positive refractive power. The object-side surface 71 of the fifth lens element 7 has a convex portion 711 in a vicinity of the optical axis (I), a convex portion 713 in a vicinity of the periphery of the fifth lens element 7, and a concave portion 714 disposed between the convex portions 711, 713.

Shown in FIG. 31 is a table that lists values of some optical parameters corresponding to the surfaces 31, 41, 51, 61, 71, 81, 32, 42, 52, 62, 72, and 82 of the eighth preferred embodiment. The imaging lens 10 has an overall system focal length of 3.661 mm, an HFOV of 37.957°, an F-number of 1.995, and a system length of 5.110 mm.

Shown in FIG. 32 is a table that lists values of some optical parameters of the aforementioned optical relationship (1) corresponding to the eighth preferred embodiment.

Relationships among some of the aforementioned optical parameters corresponding to the eighth preferred embodiment are as follows:
T1=0.576; G12=0.171; T2=0.238; G23=0.264; T3=0.603; G34=0.394; T4=0.299; G45=0.079; T5=1.243; G5F=0.500; TF=0.210; GFP=0.533; ALT=2.959; Gaa=0.909; BFL=1.243; T1/T3=0.956; G34/G23=1.492; ALT/T3=4.909; BFL/T1=2.159; BFL/(G12+G23)=2.856; ALT/G34=7.506; (T3+T5)/G23=6.986; (T4+T5)/(G12+G45)=6.162; (T4+T5)/G34=3.912; (T1+T5)/G34=4.615; (T3+T4)/(G12+G45)=3.603; ALT/G23=11.198; (T1+T5)/T2=7.642; (T3+T4)/T2=3.788; and (T3+T5)/G34=4.683

FIGS. 33(a) to 33(d) respectively show simulation results corresponding to longitudinal spherical aberration, sagittal astigmatism aberration, tangential astigmatism aberration, and distortion aberration of the eighth preferred embodiment. It can be understood from FIGS. 33 (a) to 33 (d) that the eighth preferred embodiment is able to achieve a relatively good optical performance.

Shown in FIGS. 34 and 35 are tables that list the aforesaid relationships among some of the aforementioned optical parameters corresponding to the eighth preferred embodiments for comparison. When each of the optical parameters of the imaging lens 10 according to this invention satisfies the following optical relationships, the optical performance is still relatively good even with the reduced system length:

(1) T1/T3≥0.93: Since the first lens element 3 has positive refractive power, the first lens element 3 may be relatively thick. Since a thickness of the third lens element 5 is not particularly limited, the design of T1/T3 tends to be large, and is suggested to be greater than or equal to 0.93. Preferably, 0.93≤T1/T3≤2.00.

(2) 0.90≤G34/G23≤2.40: Either G34 or G23 should be designed to be within a proper range for facilitating reduction of the system length. Better arrangement may be achieved when the above relationship is satisfied.

(3) ALT/T3≤7.00: Since the reducible ratio of ALT is relatively large as compared to the reducible ratio of T3, design of ALT/G23 is suggested to be smaller than 7.00. Preferably, 3.50≤ALT/T3≤7.00.

(4) BFL/T1≤3.20: since design of BFL should be sufficient for accommodating the optical filter 8 and other elements, the reducible ratio of BFL is relatively small. Since the first lens element 3 has positive refractive power, the first lens element 3 may be relatively thick. The reducible ratio of T1 is relatively small as compared to BFL. Thus, the design of BFL/T1 is suggested to be smaller than or equal to 3.20. Preferably, 1.20≤BFL/T1≤3.20. More preferably, 1.20≤BFL/T1≤2.50.

(5) BFL/(G12+G23)≥3.40: Since design of BFL should be sufficient for accommodating the optical filter 8 and other elements, thus the reducible ratio of BEL is relatively small. Preferably, 3.40≤BFL/(G12+G23)≤6.70.

(6) ALT/G34≥7.00: While taking the imaging quality and optical path into consideration, better arrangement may be obtained when this relationship is satisfied. Preferably, 7.00≤ALT/G34≤18.00.

(7) (T3+T5)/G23≥4.90, (T3+T5)/G34≥3.80: Since the fifth lens element 7 has a relatively large effective optical diameter, the reducible ratio of T5 is relatively small. The design of (T3+T5)/G23 is suggested to be greater than or equal to 4.90, and the design of (T3+T5)/G34 is suggested to be greater than or equal to 3.80. Preferably, 4.90≤(T3+T5)/G23≤10.50, and 3.80≤(T3+T5)/G34≤6.50.

(8) 4.00≤(T4+T5)/(G12+G45)≤7.70: Better arrangement and imaging quality, as well as reduction of the system length of the imaging lens 10, may be achieved when this relationship is satisfied. Preferably, 5.50≤(T4+T5)/(G12+G45)≤7.70.

(9) (T4+T5)/G34≥3.25: Since each of the fourth and fifth lens elements 6,7 has a relatively large effective optical diameter, the reducible ratios of T4, T5 are relatively small. Thus, the design of (T4+T5)/G34 is suggested to be greater than or equal to 3.25. Preferably, 3.25≤(T4+T5)/G34≤8.00.

(10) (T1+T5)/G34≥3.70, (T1+T5)/T2≥3.00: Since the first lens element 3 has positive refractive power and the fifth lens elements 7 has a relatively large effective optical diameter, the reducible ratios of T1, T5 are relatively small. Better arrangement and imaging quality, as well as reduction of the system length of the imaging lens 10, may be achieved when these relationships are satisfied. Preferably, 3.70≤(T1+T5)/G34≤8.00, 3.00≤(T1+T5)/T2≤8.00.

(11) (T3+T4)/(G12+G45)≥3.00: Better arrangement and imaging quality, as well as reduction of the system length of the imaging lens 10, may be achieved when this relationship is satisfied. Preferably, 3.00≤(T3+T4)/(G12+G45)≤8.00.

(12) ALT/G23≥10.55: While taking the imaging quality and optical path into consideration, better arrangement may be obtained when the above relationship is satisfied. Preferably, 10.55≤ALT/G23≤25.00.

(13) (T3+T4)/T2≥2.75: Since the second lens element 5 has a relatively small effective optical diameter, the reducible ratio of T2 is relatively large. The design of (T3+T4)/T2 is suggested to be larger than or equal to 2.75. Preferably, 2.75≤(T3+T4)/T2≤5.50.

To sum up, effects and advantages of the imaging lens 10 according to the present invention are described hereinafter.

1. The first lens element 3 with the positive refractive power favors light convergence that may reduce length of the imaging lens 10. In addition, by virtue of the convex portion 411, the concave portion 412, the concave portion 512, the concave portion 611, the convex portion 621, the convex portion 711, the concave portion 721, and the convex portion 722, optical aberration of the image may be corrected, thereby ensuring imaging quality of the imaging lens 10. Since the fifth lens element 7 is made of a plastic material, weight and cost of the imaging lens 10 may be reduced.

2. Through design of the relevant optical parameters, optical aberrations, such as spherical aberration, may be reduced or even eliminated. Further, through surface design and arrangement of the lens elements 3-7, even with reduced system length, optical aberrations may still be reduced or even eliminated, resulting in relatively good optical performance.

3. Through the aforesaid eight preferred embodiments, it is known that the system length of this invention may be reduced down to below 5.2 mm, so as to facilitate developing thinner relevant products with economic benefits.

Figure 36:
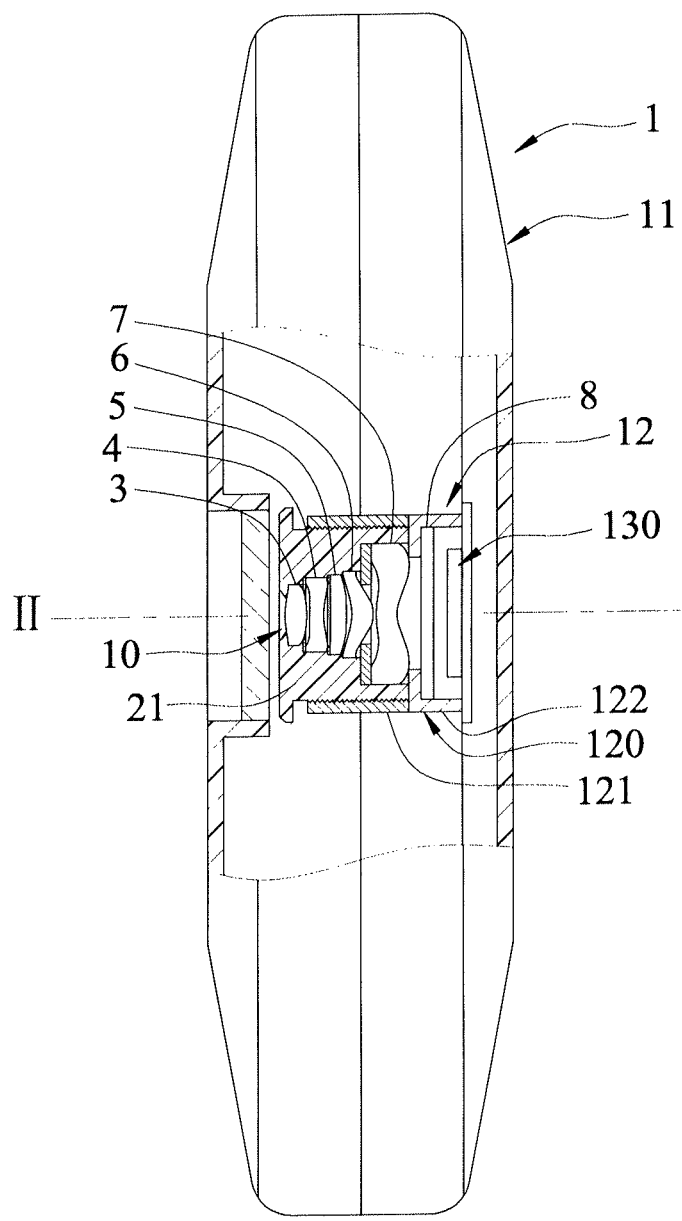
FIG. 36 is a schematic partly sectional view to illustrate a first exemplary application of the imaging lens of the present invention.

Shown in FIG. 36 is a first exemplary application of the imaging lens 10, in which the imaging lens 10 is disposed in a housing 11 of an electronic apparatus 1 (such as a mobile phone, but not limited thereto), and forms a part of an imaging module 12 of the electronic apparatus 1. The imaging module 12 includes a barrel 21 on which the imaging lens 10 is disposed, a holder unit 120 on which the barrel 21 is disposed, and an image sensor 130 disposed at the image plane 100 (see FIG. 2).

The holder unit 120 includes a first holder portion 121 in which the barrel 21 is disposed, and a second holder portion 122 having a portion interposed between the first holder portion 121 and the image sensor 130. The barrel 21 and the first holder portion 121 of the holder unit 120 extend along an axis (II), which coincides with the optical axis (I) of the imaging lens 10.

Figure 37:
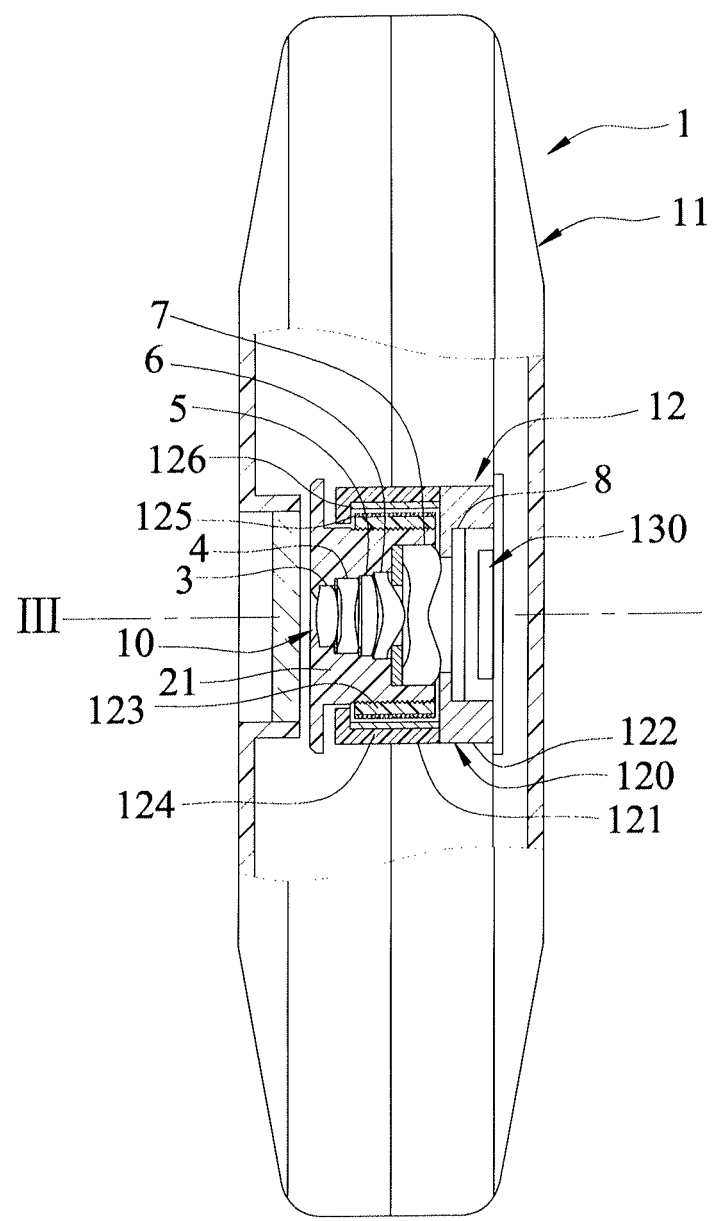
FIG. 37 is a schematic partly sectional view to illustrate a second exemplary application of the imaging lens of the present invention.

Shown in FIG. 37 is a second exemplary application of the imaging lens 10. The differences between the first and second exemplary applications reside in that, in the second exemplary application, the holder unit 120 is configured as a voice-coil motor (VCM), and the first holder portion 121 includes an inner section 123 in which the barrel 21 is disposed, an outer section 124 that surrounds the inner section 123, a coil 125 that is interposed between the inner and outer sections 123, 124, and a magnetic component 126 that is disposed between an outer side of the coil 125 and an inner side of the outer section 124.

The inner section 123 and the barrel 21, together with the imaging lens 10 therein, are movable with respect to the image sensor 130 along an axis (III), which coincides with the optical axis (I) of the imaging lens 10. The optical filter 8 of the imaging lens 10 is disposed at the second holder portion 122, which is disposed to abut against the outer section 124. Configuration and arrangement of other components of the electronic apparatus 1 in the second exemplary application are identical to those in the first exemplary application, and hence will not be described hereinafter for the sake of brevity.

By virtue of the imaging lens 10 of the present invention, the electronic apparatus 1 in each of the exemplary applications may be configured to have a relatively reduced overall thickness with good optical and imaging performance, so as to reduce cost of materials, and satisfy requirements of product miniaturization.

While the present invention has been described in connection with what are considered the most practical and preferred embodiments, it is understood that this invention is not limited to the disclosed embodiments but is intended to cover various arrangements included within the spirit and scope of the broadest interpretation so as to encompass all such modifications and equivalent arrangements.

What is claimed is:

1. An imaging lens comprising a first lens element, a second lens element, a third lens element, a fourth lens element and a fifth lens element arranged in order from an object side to an image side along an optical axis of said imaging lens, each of said first lens element, said second lens element, said third lens element, said fourth lens element and said fifth lens element having a refractive power, an object-side surface facing toward the object side, and an image-side surface facing toward the image side, wherein:
    said first lens element has a positive refractive power;
    said object-side surface of said second lens element has a convex portion in a vicinity of the optical axis and a concave portion in a vicinity of a periphery of said second lens element;
    said object-side surface of said third lens element has a concave portion in a vicinity of a periphery of said third lens element, and said image-side surface of said third lens element has a convex portion in a vicinity of the optical axis;
    said object-side surface of said fourth lens element has a concave portion in a vicinity of the optical axis, and said image-side surface of said fourth lens element has a convex portion in a vicinity of the optical axis;
    said object-side surface of said fifth lens element has a convex portion in a vicinity of the optical axis, and said image-side surface of said fifth lens element has a concave portion in a vicinity of the optical axis, and a convex portion in a vicinity of a periphery of the fifth lens element,
    said fifth lens element is made of a plastic material; and
    said imaging lens satisfies $2.00 \geq T1/T3 \geq 0.93$, $0.90 \leq G34/G23 \leq 2.40$, $4.00 \leq (T4+T5)/(G12+G45) \leq 7.70$, and $8.00 \geq (T3+T4)/(G12+G45) \geq 3.00$, where T1 represents a thickness of said first lens element at the optical axis, T3 represents a thickness of said third lens element at the optical axis, G34 represents an air gap length between said third lens element and said fourth lens element at the optical axis, G23 represents an air gap length between said second lens element and said third lens element at the optical axis, T4 represents a thickness of said fourth lens element at the optical axis, T5 represents the thickness of said fifth lens element at the optical axis, G12 represents an air gap length between said first lens element and said second lens element at the optical axis, and G45 represents an air gap length between said fourth lens element and said fifth lens element at the optical axis; and
    said imaging lens does not include any lens element with refractive power other than said first lens element, said second lens element, said third lens element, said fourth lens element and said fifth lens element.

2. The imaging lens as claimed in claim 1, further satisfying $ALT/T3 \leq 7.00$, where ALT represents a sum of thicknesses of said first lens element, said second lens element, said third lens element, said fourth lens element and said fifth lens element at the optical axis.

3. The imaging lens as claimed in claim 2, further satisfying $BFL/T1 \leq 3.20$, where BFL represents a distance at the optical axis between said image-side surface of said fifth lens element and an image plane at the image side.

4. The imaging lens as claimed in claim 3, further satisfying $6.70 \geq BFL/(G12+G23) \geq 3.40$.

5. The imaging lens as claimed in claim 2, further satisfying $18.00 \geq ALT/G34 \geq 7.00$.

6. The imaging lens as claimed in claim 5, further satisfying $10.50 \geq (T3+T5)/G23 \geq 4.90$.

7. The imaging lens as claimed in claim 2, further satisfying $8.00 \geq (T4+T5)/G34 \geq 3.25$.

8. The imaging lens as claimed in claim 7, further satisfying $8.00 \geq (T1+T5)/G34 \geq 3.70$.

9. The imaging lens as claimed in claim 1, further satisfying $BFL/T1 \leq 3.20$, where BFL represents a distance at the optical axis between said image-side surface of said fifth lens element and an image plane at the image side.

10. The imaging lens as claimed in claim 9, further satisfying 25.00≥ALT/G23≥10.55, where ALT represents a sum of thicknesses of said first lens element, said second lens element, said third lens element, said fourth lens element and said fifth lens element at the optical axis.

11. The imaging lens as claimed in claim 10, further satisfying 8.00≥(T1+T5)/T2≥3.00, where T2 represents a thickness of said second lens element at the optical axis.

12. The imaging lens as claimed in claim 1, further satisfying 18.00≥ALT/G34≥7.00, where ALT represents a sum of thicknesses of said first lens element, said second lens element, said third lens element, said fourth lens element and said fifth lens element at the optical axis.

13. The imaging lens as claimed in claim 12, further satisfying 5.50≥(T3+T4)/T2≥2.75, where T2 represents a thickness of said second lens element at the optical axis.

14. The imaging lens as claimed in claim 13, further satisfying 6.50≥(T3+T5)/G34≥3.80.

15. An electronic apparatus comprising:
a housing; and
an imaging module disposed in said housing, and including an imaging lens as claimed in claim 1, a barrel on which said imaging lens is disposed, a holder unit on which said barrel is disposed, and an image sensor disposed at the image side of said imaging lens.

* * * * *